(12) United States Patent
Wang et al.

(10) Patent No.: US 11,740,531 B2
(45) Date of Patent: Aug. 29, 2023

(54) ELECTRONIC PAPER, DISPLAY DEVICE, AND DRIVING METHOD

(71) Applicants: Beijing BOE Optoelectronics Technology Co., Ltd., Beijing (CN); BOE Technology Group Co., Ltd., Beijing (CN)

(72) Inventors: Zhe Wang, Beijing (CN); Qingqing Ma, Beijing (CN); Chao Tian, Beijing (CN); Rui Xu, Beijing (CN); Min Wang, Beijing (CN); Tianjiao Wang, Beijing (CN); Yan Zhang, Beijing (CN); Haiyang Tian, Beijing (CN)

(73) Assignees: Beijing BOE Optoelectronics Technology Co., Ltd., Beijing (CN); BOE Technology Group Co., Ltd., Beijing (CN)

(*) Notice: Subject to any disclaimer, the term of this patent is extended or adjusted under 35 U.S.C. 154(b) by 694 days.

(21) Appl. No.: 16/956,974

(22) PCT Filed: Jul. 31, 2019

(86) PCT No.: PCT/CN2019/098650
§ 371 (c)(1),
(2) Date: Jun. 22, 2020

(87) PCT Pub. No.: WO2021/016930
PCT Pub. Date: Feb. 4, 2021

(65) Prior Publication Data
US 2023/0152656 A1  May 18, 2023

(51) Int. Cl.
*G02F 1/16757* (2019.01)
*G02F 1/167* (2019.01)
(Continued)

(52) U.S. Cl.
CPC .......... *G02F 1/16757* (2019.01); *G02F 1/167* (2013.01); *G02F 1/16766* (2019.01); *G09G 3/344* (2013.01)

(58) Field of Classification Search
CPC .. G02F 1/167; G02F 1/16755; G02F 1/16757; G02F 1/1677; G02F 1/1685;
(Continued)

(56) References Cited

U.S. PATENT DOCUMENTS 6,172,798 B1   1/2001  Albert et al.
2011/0085226 A1* 4/2011  Ogawa ............... G02F 1/16757
                                                        359/296

(Continued)

FOREIGN PATENT DOCUMENTS

CN   101158795 A   4/2008
CN   103180781 A   6/2013
(Continued)

*Primary Examiner* — Brandi N Thomas
(74) *Attorney, Agent, or Firm* — ArentFox Schiff LLP; Michael Fainberg

(57) ABSTRACT

Embodiments of the present disclosure provide an electronic paper, a display device, and a driving method. A plurality of first half-cup structures each includes charged dye particles with a single electric property are provided on the first driving backplane, a plurality of second half-cup structures each includes charged dye particles with a single electric property are provided on the second driving backplane; one first half-cup structure and the opposite second half-cup structures constitute a micro-cup structure, a electric property of the charged dye particles in the first half-cup structure is opposite to that in the second half-cup structure in the same micro-cup structure; a cross-sectional area of the respective second half-cup structures gradually decreases in a direction pointing from the second driving backplane to the first driving backplane; and a cross-sectional area of the
(Continued)

respective first half-cup structures gradually decreases in an opposite direction.

20 Claims, 12 Drawing Sheets

(51) Int. Cl.
*G09G 3/34* (2006.01)
*G02F 1/16766* (2019.01)

(58) Field of Classification Search
CPC ........... G02F 2001/1678; G02F 1/1676; G02F 1/133502; G02F 1/133516; G02F 1/1333; G02F 1/133334; G02F 1/133345; G02F 1/133348; G02F 1/1343; G02F 1/134309; G02F 1/1362; G02F 1/1368; G02F 2201/42; G09G 3/344; G09G 2310/068; G09G 2330/02; G09G 2370/16; G09G 2380/04; G09G 2380/06; G09G 3/2003; G09G 3/2092; G09G 3/2096; H01L 27/1225; H01L 29/7869; H01L 29/78696; H01L 21/02565; H01L 29/66742; H01L 29/66969; H01L 21/02554; H01L 21/02631; H01L 29/78606; H01L 21/02164; H01L 21/0217; H01L 21/02178; H01L 21/02266; H01L 21/02667; H01L 21/428; H01L 21/465; H01L 21/477; H01L 22/34; H01L 27/0207; H01L 27/1214; H01L 27/124; H01L 27/1248; H01L 27/1285; H01L 29/04; H01L 29/045; H01L 29/06; H01L 29/24; H01L 29/26; H01L 29/41733; H01L 29/42356; H01L 29/42384; H01L 29/4908; H01L 29/495; H01L 29/513; H01L 29/517; H01L 29/786; H01L 29/78618; H01L 29/78669; H01L 29/78678; H01L 29/78693; H01L 2924/0002

See application file for complete search history.

(56) References Cited

U.S. PATENT DOCUMENTS

| | | | |
|---|---|---|---|
| 2011/0273760 | A1 | 11/2011 | Hsieh et al. |
| 2012/0008188 | A1 | 1/2012 | Telfer et al. |
| 2017/0103709 | A1 | 4/2017 | Lin et al. |

FOREIGN PATENT DOCUMENTS

| | | | |
|---|---|---|---|
| CN | 108139645 | A | 6/2018 |
| CN | 109613772 | A | 4/2019 |
| CN | 109656076 | A | 4/2019 |
| TW | 201140214 | A | 11/2011 |

* cited by examiner

ELECTRONIC PAPER, DISPLAY DEVICE, AND DRIVING METHOD

CROSS REFERENCE TO RELATED APPLICATIONS

This application is a National Stage of International Application No. PCT/CN2019/098650, filed on Jul. 31, 2019, which is hereby incorporated by reference in its entirety.

FIELD

The present disclosure relates to the field of display technologies, and in particular, to an electronic paper, a display device, and a driving method.

BACKGROUND

Display technologies of an electronic paper in the related art mainly uses a principle of electrophoretic display (EPD) to present colors of particles on a display side by driving dyed particles with two different electric properties to move back and forth. After power off, the particles can maintain their positions to show a "steady state". More common ones are display products with black (positive charge), white (negative charge) and red (positive charge) three-color mixed and these three colors are of unlike electric properties. However, for the electronic paper in the related art, the dyed particles with the unlike electric properties are distributed in the same micro-cup/microcapsule, and there is a built-in attraction electric field formed by positive and negative particles. Consequently, a display effect is inevitably reduced, and driving requirements are relatively high.

SUMMARY

Embodiments of the present disclosure provide an electronic paper, including:
a first driving backplane;
a plurality of first half-cup structures provided on the first driving backplane; wherein each of the first half-cup structures includes charged dye particles with a single electric property;
a second driving backplane;
a plurality of second half-cup structures provided on the second driving backplane; wherein each of the second half-cup structures includes charged dye particles with a single electric property; wherein
a side of the second driving backplane provided with the second half-cup structures is opposite to a side of the first driving backplane provided with the first half-cup structures, the each first half-cup structure and a respective one of the second half-cup structures opposite to the each first half-cup structure constitute a micro-cup structure, and a electric property of the charged dye particles in the first half-cup structure in the micro-cup structure is opposite to a electric property of the charged dye particles in the second half-cup structure in the micro-cup structure; and
a cross-sectional area of the respective second half-cup structures gradually decreases in a direction pointing from the second driving backplane to the first driving backplane; and a cross-sectional area of the respective first half-cup structures gradually decreases in a direction pointing from the first driving backplane to the second driving backplane.

In a possible implementation, the electronic paper further includes an electrode plate layer between the first half-cup structures and the second half-cup structures; wherein the electrode plate layer includes two opposite transparent insulation plate layers and a transparent electrode layer between the two transparent insulation plate layers.

In a possible implementation, the transparent electrode layer is of a whole layer structure.

In a possible implementation, each of the first half-cup structures and each of the second half-cup structures are prism-shaped, or each of the first half-cup structures and each of the second half-cup structures are conical-frustum-shaped; and an orthographic projection, on the first driving backplane, of the first half-cup structures overlaps an orthographic projection, on the first driving backplane, of the second half-cup structures.

In a possible implementation, shapes of cross sections that are parallel to the first driving backplane of the first half-cup structure and the second half-cup structure opposite to it are both regular hexagons or circles; wherein a distance between any two points in a minimum cross section is not more than 15 micrometers, a distance between two opposite edges of a maximum regular hexagonal cross section is 130 micrometers to 150 micrometers, and a diameter in a maximum circular cross section is 130 micrometers to 150 micrometers.

In a possible implementation, a height of each of the first half-cup structures and a height of each of the second half-cup structures both are 60 micrometers to 70 micrometers.

In a possible implementation, the charged dye particles in the plurality of first half-cup structures have the same electric properties, and the charged dye particles in the plurality of second half-cup structures have the same electric properties.

In a possible implementation, a surface, away from the second driving backplane, of the first driving backplane is a display surface; and the charged dye particles with the single electric property in each of the first half-cup structures are charged dye particles of two colors with different charge-to-mass ratios.

In a possible implementation, each of the second half-cup structures includes the charged dye particles of one color, and the color of the charged dye particles in the second half-cup structures is different from the color of the charged dye particles in the first half-cup structures.

In a possible implementation, a surface, away from the first driving backplane, of the second driving backplane is further provided with a reflection layer, and a color of the reflection layer is different from both the color of the charged dye particles in first half-cup structures and the color of the charged dye particles in the second half-cup structures.

In a possible implementation, the charged dye particles of two colors in each of the first half-cup structures are respectively red charged dye particles with positive charges and black charged dye particles with positive charges, wherein a charge-to-mass ratio of the black charged dye particles is greater than a charge-to-mass ratio of the red charged dye particles; the charged dye particles in each of the second half-cup structures are white charged dye particles with negative charges; and the color of the reflection layer is yellow.

In a possible implementation, the first driving backplane and the second driving backplane each include a transparent substrate, and a plurality of pixel circuits on the transparent substrate; wherein one of the pixel circuits correspondingly drives one micro-cup structure, the pixel circuits of the first driving backplane are between the transparent substrate of the first driving backplane and the first half-cup structures of the first driving backplane, and the pixel circuits of the second driving backplane are between the transparent substrate of the second driving backplane and the second half-cup structures of the second driving backplane.

In a possible implementation, each of the pixel circuits includes: a first electrode layer, a gate insulation layer, an active layer, a source-drain layer, a passivation layer, and a pixel electrode layer located on the transparent substrate in sequence; wherein the first electrode layer includes gates separated from each other and a common electrode, the source-drain layer includes sources and drains, and the pixel electrode layer is electrically connected with the respective one drain by through respective holes penetrating through the passivation layer; and an orthographic projection, on the transparent substrate, of the pixel electrode layer overlaps an orthographic projection, on the transparent substrate, of the micro-cup structure, and the orthographic projection, on the transparent substrate, of the pixel electrode layer overlaps an orthographic projection, on the transparent substrate, of the common electrode; the pixel electrode layer of the first driving backplane and the pixel electrode layer of the second driving backplane are configured to load a voltage that controls movement of the charged dye particles when displaying; the pixel electrode layer of the first driving backplane and the common electrode of the first driving backplane are configured to form a first storage capacitor to maintain stability of a voltage of the pixel electrode layer of the first driving backplane when displaying; and the pixel electrode layer of the second driving backplane and the common electrode of the second driving backplane are configured to form a second storage capacitor to maintain stability of a voltage of the pixel electrode layer of the second driving backplane when displaying.

In a possible implementation, materials of the pixel electrode layer and the common electrode are transparent conductive materials.

Based on the same inventive concept, an embodiment of the present disclosure further provides a display device, including the electronic paper provided by the embodiments of the present disclosure.

Based on the same inventive concept, an embodiment of the present disclosure further provides a driving method for the electronic paper provided by the embodiments of the present disclosure, wherein the driving method includes:

in a first display mode, loading a voltage to a first driving circuit and a second driving circuit to form a first electric field to display by the charged dye particles in the first half-cup structures; wherein the first electric field controls the charged dye particles in first half-cup structures to move away from second half-cup structures, and controls the charged dye particles in the second half-cup structures to move away from the first half-cup structures; and in a second display mode, loading a voltage to the first driving circuit and the second driving circuit to form a second electric field to display by the charged dye particles in the second half-cup structures, wherein the second electric field controls the charged dye particles in the first half-cup structures to move towards the second half-cup structures, and controls the charged dye particles in the second half-cup structures to move away from the first half-cup structures.

In a possible implementation, the charged dye particles having a single electric property in each of the first half-cup structures are charged dye particles of two colors with different charge-to-mass ratios, and in the first display mode, display is performed by the charged dye particles with a large charge-to-mass ratio in the first half-cup structures; and the driving method further includes:

in a third display mode, loading a voltage with a first duration to the first driving circuit and the second driving circuit to form a third electric field, loading another voltage with second duration to the first driving circuit and the second driving circuit to form a fourth electric field, and cyclically forming the third electric field and the fourth electric field for multiple times until the charged dye particles having a small charge-to-mass ratio in the first half-cup structures move to a side, facing the first driving backplane, of the charged dye particles with the large charge-to-mass ratio to display by the charged dye particles with the small charge-to-mass ratio in the first half-cup structures; wherein an electric field direction of the third electric field is opposite to that of the first electric field, an electric field direction of the fourth electric field is opposite to that of the third electric field, an electric field intensity of the third electric field is greater than that of the fourth electric field, and the first duration is less than the second duration.

In a possible implementation, the surface, away from the first driving backplane, of a second driving backplane is further provided with the reflection layer of a preset color; and the driving method further includes:

in a fourth display mode, loading a voltage to the first driving circuit and the second driving circuit to form a fifth electric field to display by the reflection layer, wherein the fifth electric field controls the charged dye particles in the first half-cup structures to aggregate at an end face facing the second half-cup structures, and controls the charged dye particles in the second half-cup structures to aggregate at an end face facing the first half-cup structures.

In a possible implementation, the driving method further includes: in the fourth display mode, adjusting an electric field intensity of the fifth electric field to control reflectivity of the reflection layer to be different, wherein the fifth electric field with different electric field intensities controls aggregation density of the charged dye particles in the first half-cup structures and the second half-cup structures to be different.

DETAILED DESCRIPTION OF THE EMBODIMENTS

Figure 1:
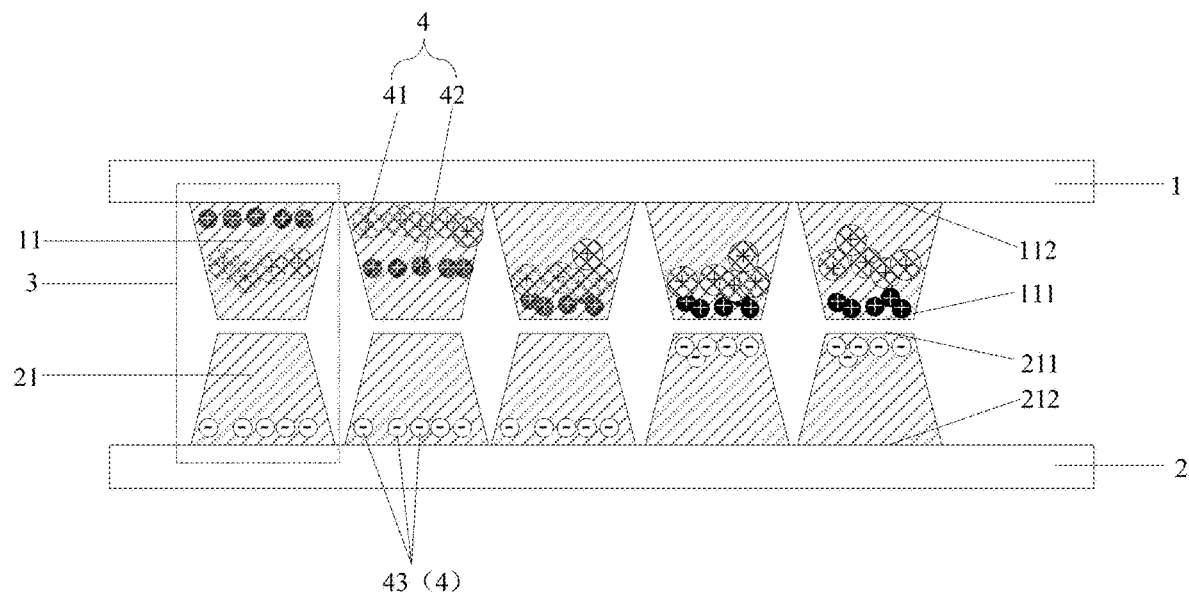
FIG. 1 is a schematic structural diagram of an electronic paper provided by an embodiment of the present disclosure.

The implementation process of the embodiments of the present application is described in detail below with reference to the accompanying drawings of the description. It should be noted that the same or similar reference numerals indicate the same or similar elements or elements with the same or similar functions throughout. The embodiments described below with reference to the drawings are exemplary and are only used to explain the present application, and cannot be construed as limiting the present application.

An embodiment of the present disclosure provides an electronic paper, referring to FIG. 1, including a first driving backplane 1 and a second driving backplane 2.

A plurality of first half-cup structures 11 is on the first driving backplane, and each of the first half-cup structures 11 includes charged dye particles 4 with a single electric property.

A plurality of second half-cup structures 21 is on the second driving backplane 2, and each of the second half-cup structures 21 includes charged dye particles 4 with a single electric property. A side of the second driving backplane 2 provided with the second half-cup structures 21 is opposite to a side of the first driving backplane 1 provided with the first half-cup structures 11. That is, for example, as shown in FIG. 1, the side of the second driving backplane 2 provided with the second half-cup structures 21 is an upper side of the second driving backplane 2, and the side of the first driving backplane 1 provided with the first half-cup structures 11 is a lower side of the first driving backplane 1. When the first driving backplane 1 and the second driving backplane 2 are oppositely closed, the lower side of the first driving backplane 1 and the upper side of the second driving backplane 2 are oppositely closed. When opposite closing is performed, the first half-cup structures 11 directly face the second half-cup structures 21 one by one for opposite closing, and one first half-cup structure 11 and the opposite second half-cup structure 21 constitute a micro-cup structure 3. The electric property of the charged dye particles in the first half-cup structure 11 is opposite to that of the charged dye particles in the second half-cup structure 21 in the same micro-cup structure 3. For example, for a first half-cup structures 11 and a second half-cup structures 21 in the same micro-cup structure 3, if the electric property of the charged dye particles in the first half-cup structures 11 is positive, the electric property of the charged dye particles in the second half-cup structures 21 is negative; if the electric property of the charged dye particles in the first half-cup structures 11 is negative, the electric property of the charged dye particles in the second half-cup structures 21 is positive. The first half-cup structure 11 and the second half-cup structure 21 do not communicate with each other.

A cross-sectional area of the second half-cup structure 21 gradually decreases in a direction pointing from the second driving backplane 2 to the first driving backplane 1. A cross-sectional area of the first half-cup structure 11 gradually decreases in a direction pointing from the first driving backplane 1 to the second driving backplane 2. For example, as shown in FIG. 1, end faces, proximate to the second half-cup structures 21, of the first half-cup structures 11 are used as first half-cup structure cup tops 111, and end faces, away from the second half-cup structures 21, of the first half-cup structures 11 are used as first half-cup structure cup bottoms 112. An end face area of the first half-cup structure cup tops 111 is smaller than an end face area of the first half-cup structure cup bottoms 112, that is, as shown in FIG. 1, each of the first half-cup structures is in a shape with a large upper part and a small lower part. Similarly, end faces, proximate to the first half-cup structures 11, of the second half-cup structures 21 are used as second half-cup structure cup tops 211, and end faces, away from the first half-cup structures 11, of the second half-cup structures 21 are used as second half-cup structure cup bottoms 212. An end face area of the second half-cup structure cup tops 211 is smaller than an end face area of the second half-cup structure cup bottoms 212, that is, as shown in FIG. 1, each of the second half-cup structures 21 is in a shape with a small upper part and a large lower part, and is mutually symmetrical with the first half-cup structures 11. The first half-cup structure cup top 111 is closed, and the second half-cup structure cup top 211 is closed. That is, the first half-cup structures 11 and the second half-cup structures 21 are both of independent closed structures, so the charged dye particles 4 of the two do not migrate with each other. That is, the charged dye particles 4 in the first half-cup structures 11 do not migrate into the second half-cup structures 21, and the charged dye particles 4 in the second half-cup structures 21 do not migrate into the first half-cup structures 11.

The electronic paper provided by the embodiment of the present disclosure includes the two driving backplanes. The first driving backplane 1 is provided with the plurality of first half-cup structures 11, and the second driving backplane 2 is provided with the plurality of second half-cup structures 21. Both the first half-cup structures 11 and the second half-cup structures 21 are only provided with charged dye particles 4 with a single electric property, and the charged dye particles 4 with the different electric properties can be separated and placed in different cups. So a necessary distance of driving movement of the charged dye particles 4 is reduced, a driving time of image refresh is greatly shortened, and power consumption is reduced. Poor display image purity maintenance, a longer drive time required for image refresh, and large power consumption that are caused by the charged dye particles 4 with the unlike electric properties mixed together are avoided. In addition, since the first half-cup structures 11 and the second half-cup structures 21 are both in shapes with gradually decreasing cross-sectional areas, and then when display is driven, the charged dye particles 4 in the first half-cup structures 11 can move to a side proximate to the display surface and the charged dye particles 4 in the second half-cup structures 21 move to a side away from the display surface by applying an electric field if a surface of the first driving backplane 1 away from the second driving backplane 2 is used as a display surface, so that the charged dye particles in the first half-cup structures 11 can be driven to display. Similarly, the charged dye particles in the first half-cup structures 11 of the first driving backplane 1 can move to a position, i.e. a position at which the first half-cup structure cup top 111 located, proximate to the second half-cup structures 21 and the charged dye particles 4 in the second half-cup structures 21 move to the side away from the display surface by adjusting the electric field. Because a cross-sectional area of the first half-cup structures 11 at this position, i.e., a position at which the first half-cup structure cup top 111 located, is small, the charged dye particles 4 in the first half-cup structures 11 at this position cannot be seen by the human eye, and a transparent state can be realized. The charged dye particles in the second half-cup structures 21 can be seen through the first half-cup structures 11, and the charged dye particles in the second half-cup structures 21 can also be driven to display, so that colors displayed by the electronic paper are enriched, and a display utilization rate of the charged dye particles is increased. Compared with the electronic paper without a micro-cup structure with a change in cross-sectional area, the embodiments of the present disclosure can implement a multi-grayscale four-color complex image, and the charged dye particles are all limited into the half-cup structures, so that bistable and lower power consumption are realized.

Figure 2:
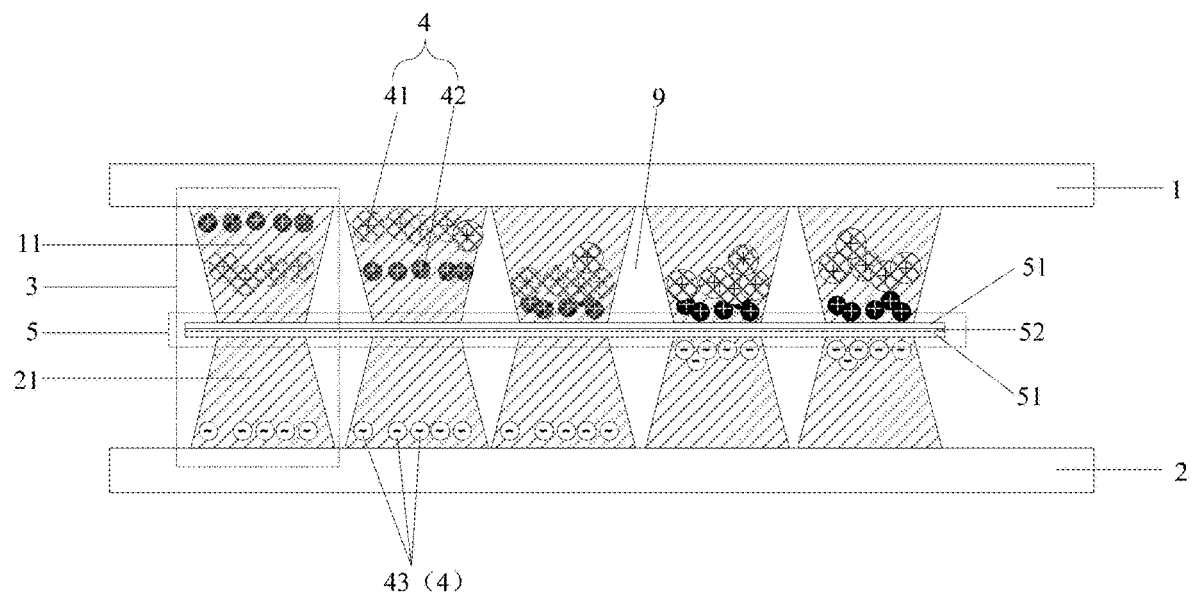
FIG. 2 is a schematic structural diagram of an electronic paper provided with an electrode plate layer provided by the embodiment of the present disclosure.

In specific implementation, referring to FIG. 2, the electronic paper of the embodiment of the present disclosure further includes an electrode plate layer 5 between the first half-cup structures 11 and the second half-cup structures 21. The electrode plate layer 5 includes two opposite transparent insulation plate layers 51 and a transparent electrode layer 52 between the two transparent insulation plate layers 51. In the embodiment of the present disclosure, the electronic paper further includes an electrode plate layer 5, and the electrode plate layer 5 includes two transparent insulation plate layers 51 and a transparent electrode layer 52 positioned therein. Then the electrode plate layer 5 cooperates with the first driving backplane 1 and the second driving backplane 2 to form different electric fields at the position where a micro-cup structure 3 is located. For example, an electric field in a direction pointing from the first driving backplane 1 to the electrode plate layer 5 can be formed, and an electric field in a direction pointing from the second driving backplane 2 to the middle electrode plate layer 5 can also be formed at the same time, so that the charged dye particles 4 in the first half-cup structures 11 and the second half-cup structures 21 can be individually controlled. The transparent insulation layer plates 51 on both sides of the transparent electrode layer 52 can support the transparent electrode layer 52 on the one hand. On the other hand, when the charged dye particles 4 in the first half-cup structures 11 aggregate at the position of the first half-cup structure cup top 111, and the charged dye particles in the second half-cup structures 21 aggregate at the position of the second half-cup structure cup top 211, even if electric polarity of the two types of charged dye particles 4 are opposite, and the distances are closer, a capacitor is not formed and there is no discharge.

Specifically, the transparent electrode layer 52 may be a whole layer structure, that is, the transparent electrode layers between all the micro-cup structures 3 communicate with one another, and it is convenient for manufacturing. Specifically, the transparent electrode layers between all the micro-cup structures 3 may also be independent with one another, and all the micro-cup structures 3 are separately controlled. A material of the transparent electrode layer 52 may specifically be indium tin oxide. Currently, indium tin oxide is the commonly used transparent electrode material, and light transmittance of indium tin oxide is often above 90%. This is beneficial to the display of the charged dye particles 4 on the side, away from the display surface, of the electrode plate layer 5.

In specific implementation, electric properties of the charged dye particles 4 in the plurality of first half-cup structures 11 are same. Specifically, the electric properties of the charged dye particles 4 in all the first half-cup structures 11 of the first driving backplane may be same. Electric properties of the charged dye particles 4 in the plurality of second half-cup structures 21 are same. Specifically, the electric properties of the charged dye particles 4 in all the second half-cup structures 21 of the second driving backplane are same. In the embodiment of the present disclosure, the charged dye particles 4 in the plurality of first half-cup structures 11 have the same electric properties, and the charged dye particles 4 in the plurality of second half-cup structures 21 also have the same electric properties, so that manufacturing can be performed with convenience.

In specific implementation, the surface, away from the second driving backplane 2, of the first driving backplane 1 is the display surface. The charged dye particles 4 with the single electric property of each of the first half-cup structures 11 are charged dye particles of two colors with different charge-to-mass ratios. That is, each of the first half-cup structures 11 includes two colors of charged dye particles 4, and the charge-to-mass ratios of the two colors of charged dye particles 4 are different. In the embodiment of the present disclosure, when the surface of the first driving backplane 1 away from the second driving backplane 2 is used as the display surface, the first half-cup structures 11 may specifically be provided with charged dye particles 4 of two colors, charge-to-mass ratios of the charged dye particles 4 of the two colors are different. Because the charge-to-mass ratios of the charged dye particles 4 of the two colors are different, electrophoretic mobility of the charged dye particles 4 of the two colors in the same electric field are different. Further, distribution positions of the charged dye particles 4 of two colors can be controlled by controlling a electric field intensity and a electric field direction, so that the first half-cup structures 11 can display the two different colors. Certainly, the first half-cup structures 11 can also be provided with charged dye particles 4 of one color or charged dye particles 4 of more than two colors. However, the charged dye particles 4 of one color can display fewer colors, and the charged dye particles 4 of more colors increases driving complexity as well as a driving time and driving power of the electronic paper.

In specific implementation, each of the second half-cup structures 21 includes charged dye particles 4 of one color. The color of the charged dye particles 4 in the second half-cup structures 21 is different from that of the charged dye particles 4 in the first half-cup structures 11. In the embodiment of the present disclosure, because each of the second half-cup structures 21 is a half-cup structure away from the display surface, only the charged dye particles 4 of one color are in the second half-cup structure 21 to avoid impurity of displaying colors when the second half-cup structures 21 are provided with the charged dye particles of more colors. For example, in the condition that the second half-cup structures 21 are provided with charged dye particles of two colors, the charged dye particles 4 of one color may be on a side, proximate to the display surface, of charged dye particles 4 of the other color when the charged dye particles of two colors move to the side away from the display surface. When viewed from the display surface, the charged dye particles 4 located more proximate to the display surface are seen first. But at the same time, because a lower cross-sectional area of the second half-cup structures 21 is larger, the human eye can also see part charged dye particles 4 farther away from the display surface, and this makes the displayed image impure.

Figure 3:
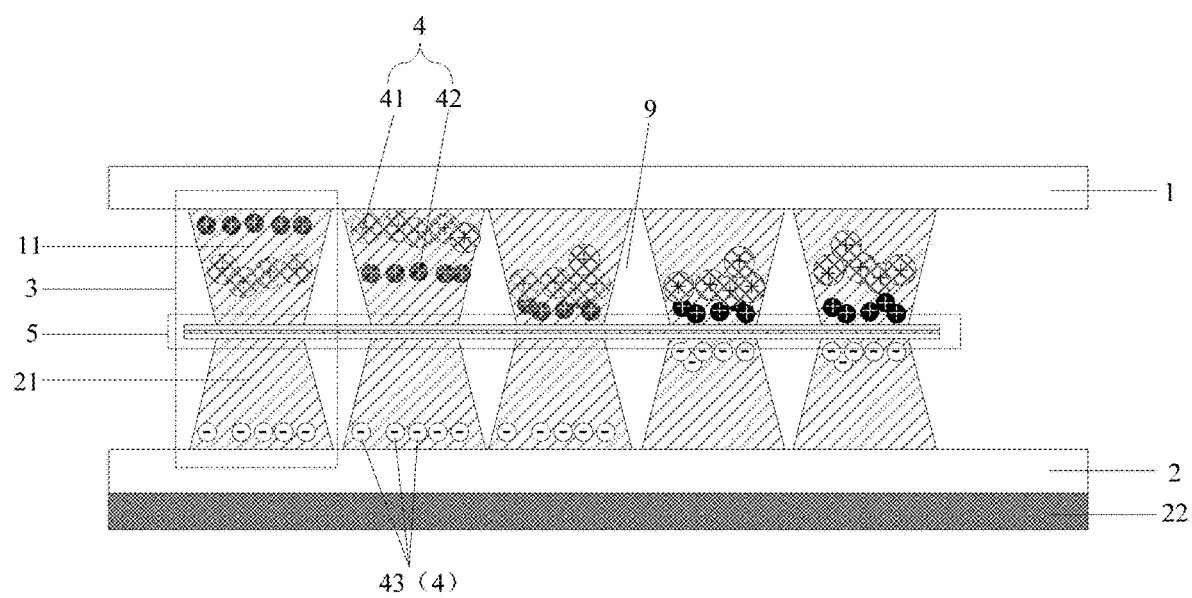
FIG. 3 is a schematic structural diagram of an electronic paper provided with a reflection layer provided by the embodiment of the present disclosure.

In specific implementation, referring to FIG. 3, a surface of the second driving backplane 2 away from the first driving backplane 1 is further provided with a reflection layer 22. A color of the reflection layer 22 is different from the colors of the charged dye particles 4 in the first half-cup structures 11 and the color of the charged dye particles 4 in the second half-cup structures 21. In the embodiment of the present disclosure, the surface of the second driving backplane 2 away from the first driving backplane 1 is further provided with a reflection layer 22 of a preset color. When the charged dye particles in the first half-cup structures 11 aggregate at the first half-cup structure cup top 111, and the charged dye particles in the second half-cup structures 21 aggregate at the second half-cup structured cup top 211, the color of the reflection layer 22 can be displayed, so the displayable color of the electronic paper is further increased. The reflection layer 22 may specifically be a stacked color layer and reflective layer, wherein the color layer is on a surface, facing the micro-cup structure, of the reflective layer. The reflection layer can be provided without increasing driving complexity (depending on types of charged dye particles). Compared with a conventional electronic paper that can only display three monotonous and easily interfered ink colors, the electronic paper in the present disclosure has better color appearance and better optical stability.

In specific implementation, with reference to FIG. 1 to FIG. 3, two types of charged dye particles in each of the first half-cup structures 11 are respectively red charged dye particles 41 with positive charges and black charged dye particles 42 with positive charges, and a charge-to-mass ratio of the black charged dye particles 42 is greater than that of the red charged dye particles 41. The charged dye particles 4 in each of the second half-cup structures 21 are white charged dye particles 43 with negative charges, and a color of the reflection layer 22 is yellow. In the embodiment of the present disclosure, two types of charged dye particles 4 in each of the first half-cup structures 11 are respectively red charged dye particles 41 with positive charges and black charged dye particles 42 with positive charges, and a charge-to-mass ratio of the black charged dye particles 42 is greater than that of the red charged dye particles 43. The charged dye particles 4 in each of the second half-cup structures 21 are white charged dye particles 43 with negative charges. A color of the reflection layer 22 is yellow. The first half-cup structures 11 are used as upper cup, and the second half-cup structures 22 are used as lower cup. So a complex image display with three-state and four-color, i.e., "upper cup positive black/red+lower cup negative white+ a reflection layer color (multi-brightness)" can be realized. In the first half-cup structures 11, a charge-to-mass ratio and a particle size of the black charged dye particles 42 are different from that of the red charged dye particles 41. According to a required difference ratio of electrophoretic mobility, generally, mobility of the black charged dye particles 42 is designed larger, mobility of the red charged dye particles 41 is designed smaller. That is, the charge-to-mass ratio of the black charged dye particles 42 is slightly larger, and the charge-to-mass ratio of the red charged dye particles 41 is slightly smaller, and the charge-to-mass ratio determines the mobility ratio. Therefore, the black charged dye particles 42 are sensitive to a high voltage, and the red charged dye particles 41 are sensitive to a low voltage. In the second half-cup structures 21, the charge-to-mass ratio of the white charged dye particles 43 and the charge-to-mass ratio of the black charged dye particles 42 can be substantially same.

In specific implementation, the first half-cup structures 11 and the second half-cup structures 21 are prism-shaped or conical-frustum-shaped, and orthographic projections, on the first driving backplane 1, of the first half-cup structures 11 overlap with orthographic projections, on the first driving backplane 1, the second half-cup structures 21.

Figure 4:
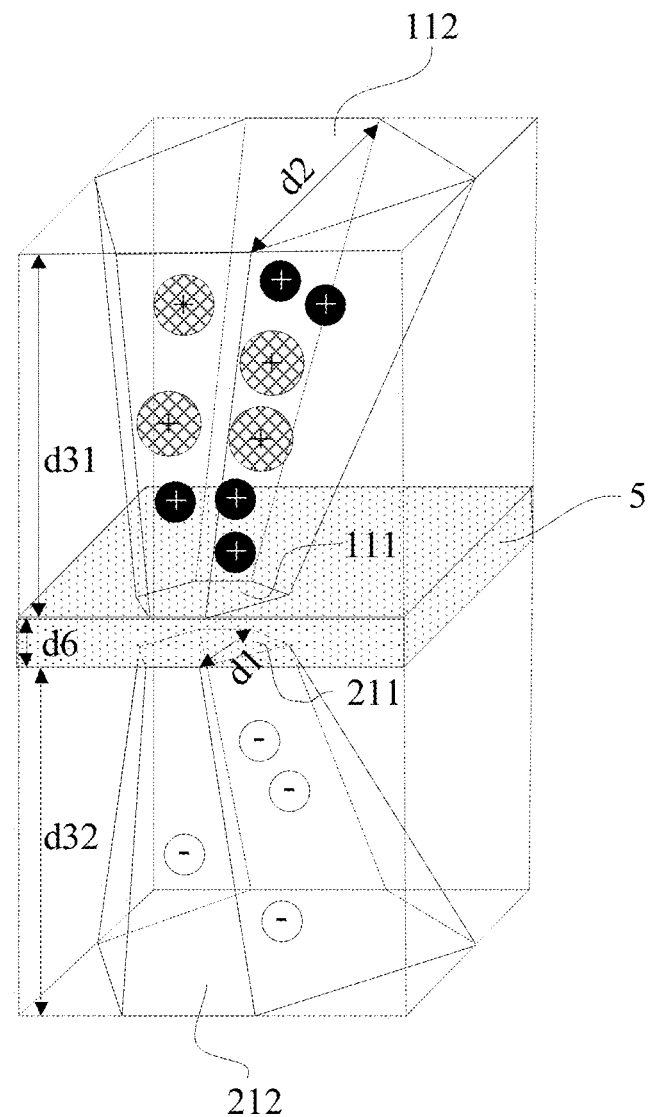
FIG. 4 is an enlarged schematic structural diagram of a micro-cup structure provided by the embodiment of the present disclosure.

In specific implementation, referring to FIG. 4, shapes of cross sections that are parallel to the first driving backplane of the first half-cup structures 11 and the second half-cup structures 21 are regular hexagons or circles. That is, the shapes of the cross sections, that are parallel to the first driving backplane, of the first half-cup structures 11 and the second half-cup structures 21 are regular hexagons, or the shapes of the cross sections, that are parallel to the first driving backplane, of the first half-cup structures 11 and the second half-cup structures 21 are circles. A distance d1 between any two points in a minimum cross section is less than 15 micrometers. When the cross section is the regular hexagon, a distance d2 between two opposite edges in a maximum regular hexagonal cross section is 130 micrometers to 150 micrometers. When the cross section is the circle, a distance d2 of a diameter in a maximum circular cross section is 130 micrometers to 150 micrometers. In the embodiment of the present disclosure, the shapes of the cross sections of the first half-cup structures 11 and the second half-cup structures 21 are regular hexagons or circles. A distance d1 between any two points in a minimum cross section is less than 15 micrometers. Because a size of 15 micrometers is the limit range invisible to the human naked eye. When the charged dye particles 4 are driven to aggregate at the cup top, that is, when the charged dye particles 4 in the first half-cup structures 11 are at the first half-cup structure cup top 111 and the charged dye particles 4 in the second half-cup structures 21 are at the second half-cup structure cup top 211, the micro-cup structure 3 as a whole presents a transparent light transmission state. And if a surface of the second driving backplane 2 away from the first driving backplane 1 is combined with the reflection layer 22, color of the reflection layer 22 can be further displayed. A distance between two opposite edges in a maximum regular hexagonal cross section is 130 micrometers to 150 micrometers, and a diameter in a maximum circular cross section is 130 micrometers to 150 micrometers. When pixels per inch (PPI) of the electronic paper is less than 169 (in fact, PPI may be about 200), that is, a size of each pixel is relatively large, a size of a pixel electrode can be substantially equal to a size of a maximum end face of the first micro-cup structure, so that one pixel electrode can drive one micro-cup structure, and display uniformity of the micro-cup structure is better, to avoid poor display uniformity caused by multiple pixel electrodes driving one micro-cup structure. In this way, lateral optical quality in the display surface can be improved. However, on the other hand, the size of the maximum cross section of the micro-cup structure 3 cannot be reduced indefinitely due to process limitations. Currently, the process can implement production of cylindrical structures with a maximum distance of 100 micrometers in the cross section and a height of 8 micrometers to 100 micrometers. Therefore, the distance d2 between the two opposite edges in the maximum cross section is 130 micrometers to 150 micrometers, which is also a size range that can be realized by the process. In addition, if the PPI is larger, feasibility of the micro-cup structure with a small cup top size in the process can be ensured by correspondingly reducing the height of the half-cup structures in the process.

In specific implementation, a height d31 of the first half-cup structures is 60 micrometers to 70 micrometers, and a height d32 of the second half-cup structures is 60 micrometers to 70 micrometers. Specifically, the height of the first half-cup structures is equal to that of the second half-cup structures. In the embodiment of the present disclosure, on the one hand, if the heights of the first half-cup structures 11 and the second half-cup structures 21 are too small, a movement distance for effectively displaying the charged dye particles 4 is insufficient, so the driving difficulty is increased. For example, if the first half-cup structures 11 include the charged dye particles 4 of two different colors, the charged dye particles 4 with a large charge-to-mass ratio and the charged dye particles 4 with the small charge-to-mass ratio need to form a position difference during multiple round-trip movements when the charged dye particles with a small charge-to-mass ratio in the first half-cup structures 11 are driven to display, and if the effective movement distance is too short, it may not be possible to perform spatial location layering on the charged dye particles 4 of two colors. On the other hand, if the heights of the first half-cup structures 11 and the second half-cup structures 21 are too large, the electric field force may be small, and the image refresh time may be long. In addition, in the embodiment of the present disclosure, the charged dye particles 4 are respectively arranged in the upper and lower half-cup structures according to the electric properties, so that movement of the charged dye particles 4 with unlike electric properties is independent with one another. The height of the half-cup structure required by each of the charged dye particles is significantly reduced, a driving time can be effectively shortened, and power consumption can be reduced.

Figure 5:
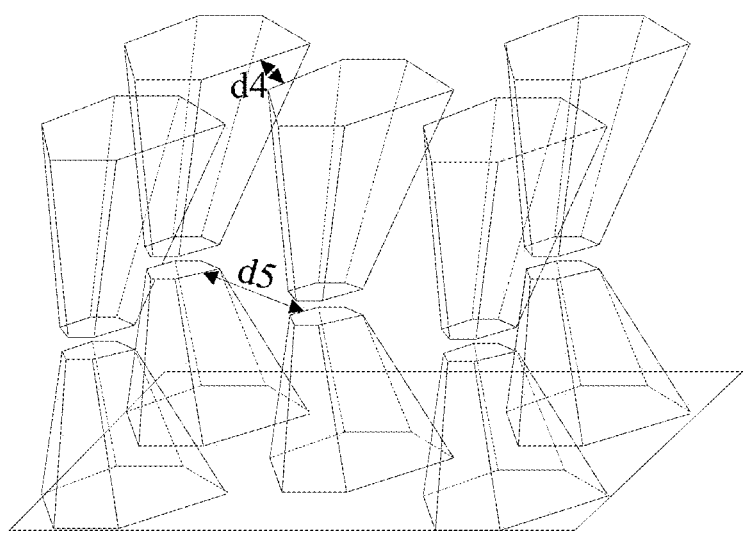
FIG. 5 is a schematic diagram of an arrangement structure of a plurality of micro-cup structures provided by the embodiment of the present disclosure.

Specifically, referring to FIG. 5, a distance d4 between the adjacent first half-cup structures 11 at a maximum cross-section is not greater than 15 micrometers. That is, for example, the first half-cup structure cup bottoms 112 are all regular hexagons, and the two adjacent regular hexagonal first half-cup structure cup bottoms 112 are placed in the way that a edge of one regular hexagonal first half-cup structure cup bottom is parallel with a edge of the other one regular hexagonal first half-cup structure cup bottom adjacent to it. The distance d4 between two close parallel edges of one first half-cup structure cup bottom 112 and the other adjacent first half-cup structure cup bottom 112 is not greater than 15 micrometers. A distance d5 of the adjacent first half-cup structures 11 at a minimum cross-section is 130 micrometers to 150 micrometers.

A vertical distance d6 between the minimum cross section of the first half-cup structure 11 and the minimum cross section of the second half-cup structure 21 opposite to the first half-cup structure 11 may be 50 micrometers to 60 micrometers. A height of the entire micro-cup structure 3 may specifically be 190 micrometers to 200 micrometers. A vertical distance between the minimum cross section of the first half-cup structure 11 and the minimum cross section of the second half-cup structure 21 opposite to the first half-cup structure 11 is 50 micrometers to 55 micrometers. A thickness of the electrode plate layer 5 may be 50 micrometers to 55 micrometers, the transparent electrode layer therein may specifically be 10 micrometers to 20 micrometers, and a thickness of the transparent insulation plate layer may be 15 micrometers to 25 micrometers. More specifically, the heights d3 of the first half-cup structure 11 and the second half-cup structure 21 may both be 70 micrometers, the vertical distance d6 between the minimum cross section of the first half-cup structure 11 and the minimum cross section of the second half-cup structure 21 opposite to the first half-cup structure 11 is 55 micrometers, and the height of the entire micro-cup can specifically be 195 micrometers. The vertical distance between the minimum cross section of the first half-cup structure 11 and the minimum cross section of the second half-cup structure 21 opposite to the first half-cup structure 11 is 55 micrometers, so an electrode plate layer 5 with a thickness of 55 micrometers can be provided. Specifically, the electrode layer plate 5 with the thickness of 55 micrometers can be formed by filling a whole 15-micrometer transparent electrode layer (specifically, may be made of thin indium tin oxide) between upper and lower transparent insulation plate layers (specifically, may be PET substrate layers) both with a thickness of 20 micrometers.

In specific implementation, the first driving backplane and the second driving backplane each include: a transparent substrate, and a plurality of pixel circuits on the transparent substrate; wherein one of the pixel circuit correspondingly drives one micro-cup structure, the pixel circuits of the first driving backplane are between the transparent substrate of the first driving backplane and the first half-cup structures of the first driving backplane, and the pixel circuits of the second driving backplane are between the transparent substrate of the second driving backplane and the second half-cup structures of the second driving backplane.

In a possible implementation, each of the pixel circuits includes: a first electrode layer, a gate insulation layer, an active layer, a source-drain layer, a passivation layer, and a pixel electrode layer located on the transparent substrate in sequence; wherein the first electrode layer includes gates separated from each other and a common electrode, the source-drain layer comprises sources and drains, and the pixel electrode layer is electrically connected with the respective one drain by through respective holes penetrating through the passivation layer; and an orthographic projection, on the transparent substrate, of the pixel electrode layer overlaps an orthographic projection, on the transparent substrate, of the micro-cup structure, and the orthographic projection, on the transparent substrate, of the pixel electrode layer overlaps an orthographic projection, on the transparent substrate, of the common electrode; the pixel electrode layer of the first driving backplane and the pixel electrode layer of the second driving backplane are configured to load a voltage that controls movement of the charged dye particles when displaying; the pixel electrode layer of the first driving backplane and the common electrode of the first driving backplane are configured to form a first storage capacitor to maintain stability of a voltage of the pixel electrode layer of the first driving backplane when displaying; and the pixel electrode layer of the second driving backplane and the common electrode of the second driving backplane are configured to form a second storage capacitor to maintain stability of a voltage of the pixel electrode layer of the second driving backplane when displaying.

Figure 6:
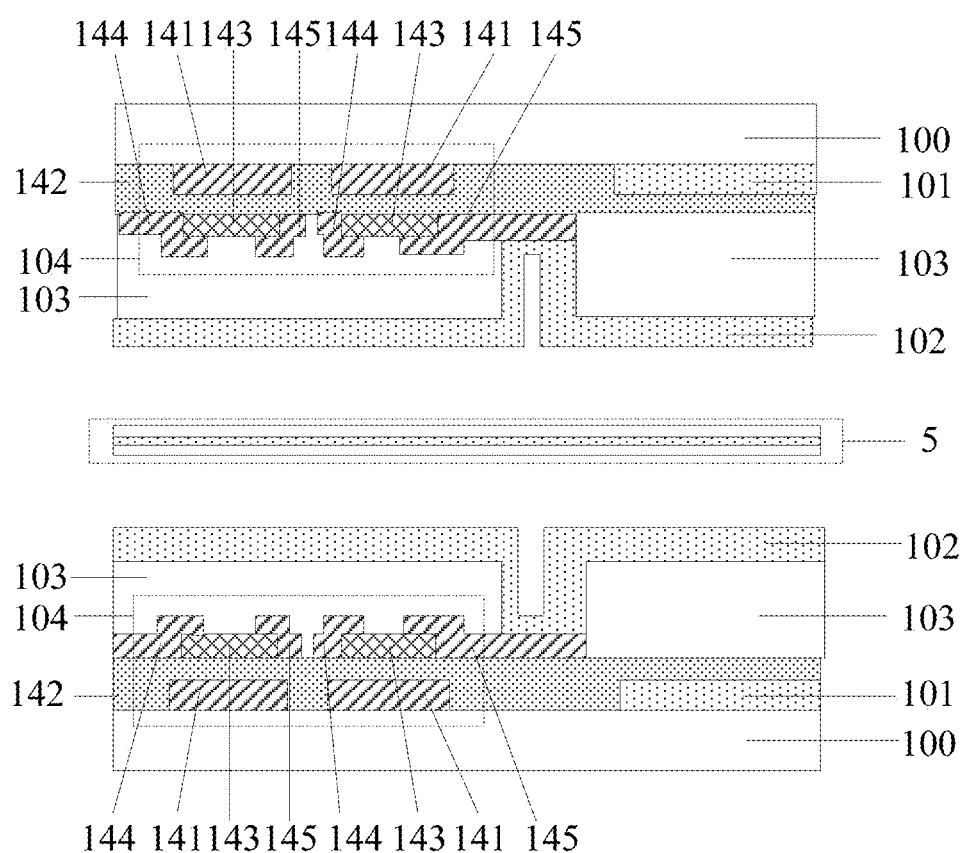
FIG. 6 is a schematic structural diagram of a first driving backplane and a second driving backplane provided by the embodiment of the present disclosure.
Figure 7:
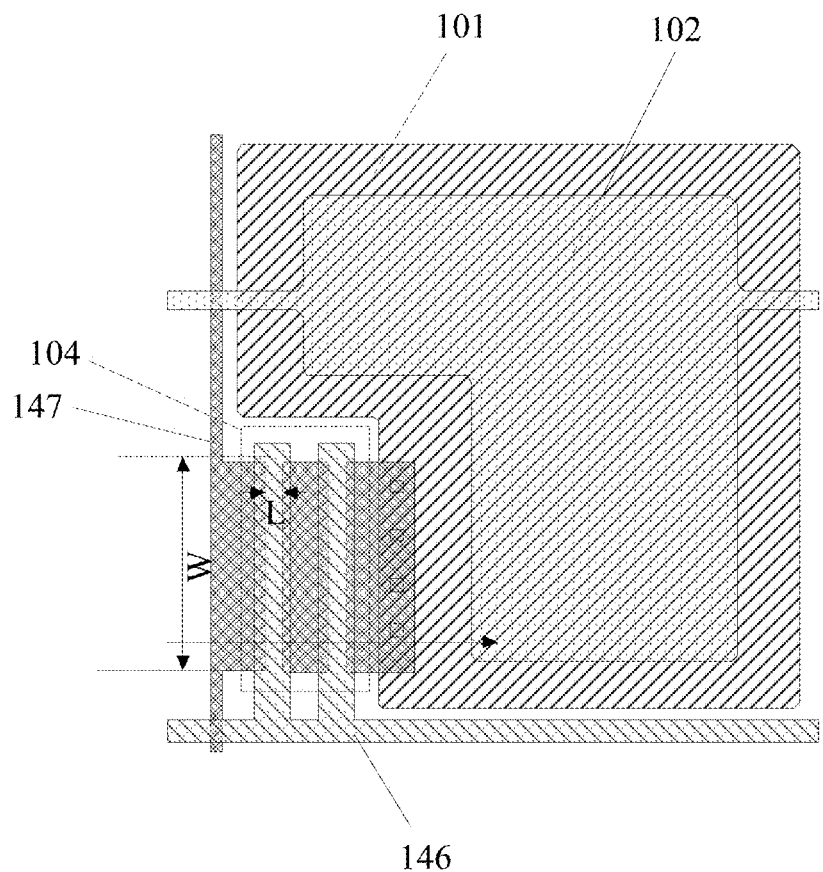
FIG. 7 is a schematic structural top view of a part of a first driving backplane provided by the embodiment of the present disclosure.

In specific implementation, referring to FIG. 6 and FIG. 7, FIG. 6 is a schematic cross-sectional structural diagram of the first driving backplane and the second driving backplane. FIG. 7 is a schematic structural top view of the first driving backplane or the second driving backplane. The first driving backplane or the second driving backplane includes: a transparent substrate 100, and a plurality of pixel circuits located on the transparent substrate 100, and one pixel circuit correspondingly drives one micro-cup structure. The pixel circuits of the first driving backplane are between the transparent substrates and the first half-cup structures of the first driving backplane, and the pixel circuits of the second driving backplane are between the transparent substrates and the second half-cup structures of the second driving backplane.

Specifically, each of the pixel circuits includes: a first electrode layer, a gate insulation layer 142, an active layer 143, a source-drain layer, a passivation layer 103, and a pixel electrode layer 102 successively on the transparent substrate 100. The first electrode layer includes gates 141 separated from one another and a common electrode 101. The source-drain layer includes sources 144 and drains 145. The pixel electrode layer 102 is electrically connected with the drains 145 by through holes penetrating through the passivation layer 103. An orthographic projection, on the transparent substrate 100, of the pixel electrode layer 102 overlaps an orthographic projection, on the transparent substrate 100, of the micro-cup structure. The orthographic projection, on the transparent substrate 100, of the pixel electrode layer 102 overlaps and an orthographic projection, on the transparent substrate 100, of the common electrodes 101. When displaying, the pixel electrode layer 102 of the first driving backplane 1 and the pixel electrode layer 102 of the second driving backplane 2 are configured to load a voltage by a thin film transistor 104 to control the movement of the charged dye particles 4. When displaying, the pixel electrode layer 102 of the first driving backplane 1 and the common electrodes 101 of the first driving backplane 1 are configured to form a first storage capacitor Cst1 to maintain stability of a voltage of the pixel electrode layer 102 of the first driving backplane 1. When displaying, the pixel electrode layer 102 of the second driving backplane 2 and the common electrodes 101 of the second driving backplane 2 are configured to forma second storage capacitor Cst2 to maintain stability of a voltage of the pixel electrode layer 102 of the second driving backplane 2. In the embodiment of the present disclosure, the first driving backplane 1 and the second driving backplane 2 are respectively provided with the pixel electrode layer 102 and the common electrode 101. Each driving backplane can implement active addressing driving, that is, the charged dye particles 4 with unlike electric properties in the first half-cup structures 11 and the second-half-cup structures 21 are respectively driven at the same time, so the driving difficulty is lower compared with the conventional method that mixed particles with unlike electric properties need to be driven at the same time. Not only single-layer driving can be performed according to the conventional driving method, but also double-layer driving can be performed, to increase selectivity of the driving method.

The gates 141, the gate insulation layer 142, the active layer 143, the sources 144, and the drains 145 constitute a thin film transistor 104, and the thin film transistor 104 may specifically be of a double gate structure.

In specific implementation, materials of the pixel electrode layer 102 and the common electrode 101 are transparent conductive materials, and may specifically be indium tin oxide (ITO), aluminum-doped zinc oxide (AZO) silver wire ink, silver wires, conductive polymer materials or metal nanowires. Because light transmittance of ITO can reach more than 90%, more specifically, the materials of the pixel electrode layer 102 and the common electrode 101 are both ITO, to meet transparency of the first driving backplane 1 and the second driving backplane 2.

In specific implementation, referring to FIG. 7, the first driving backplane 1 and the second driving backplane 2 each further includes: a gate line 146 and a data line 147. The thin film transistor 104 of the first driving backplane 1 or the second driving backplane 2 can still be formed by the original process by still the metal such as Mo/Al, and overall transmittance of the reflected light is not affected because a size of the thin film transistor 104 is relatively small (generally magnitude of tens of micrometers). In the embodiment of the present disclosure, the metal such as Mo/Al can be used for only the TFT to manufacture the gate and the source/drain, and other structural parts can be manufactured by transparent materials. In addition, in the embodiment of the present disclosure, each of the first half-cup structures 11 and each of the second half-cup structures 21 have only single charged dye particles 4, and therefore compared with the conventional electronic paper display product with two electric properties, the requirements of the storage capacitance and the thin film transistor 104 are lower. Therefore, the TFT portion can be manufactured smaller, and this is more beneficial to overall light transmittance of the first driving backplane and the second driving backplane. Specifically, the thin film transistor 104 in the embodiment of the present disclosure is of a double gate structure, a channel width W may be 22 micrometers, and a channel length may be (4.5+4.5) micrometers, that is, 9 micrometers. Because a total size of the thin film transistor 104 may be made smaller, the thin film transistor 104 is not seen by the human eye, and light transparency can be ensured. In addition, if the material and impedance are stable, the thin film transistor 104 in the embodiment of the present disclosure may also use a transparent material.

Figure 8:
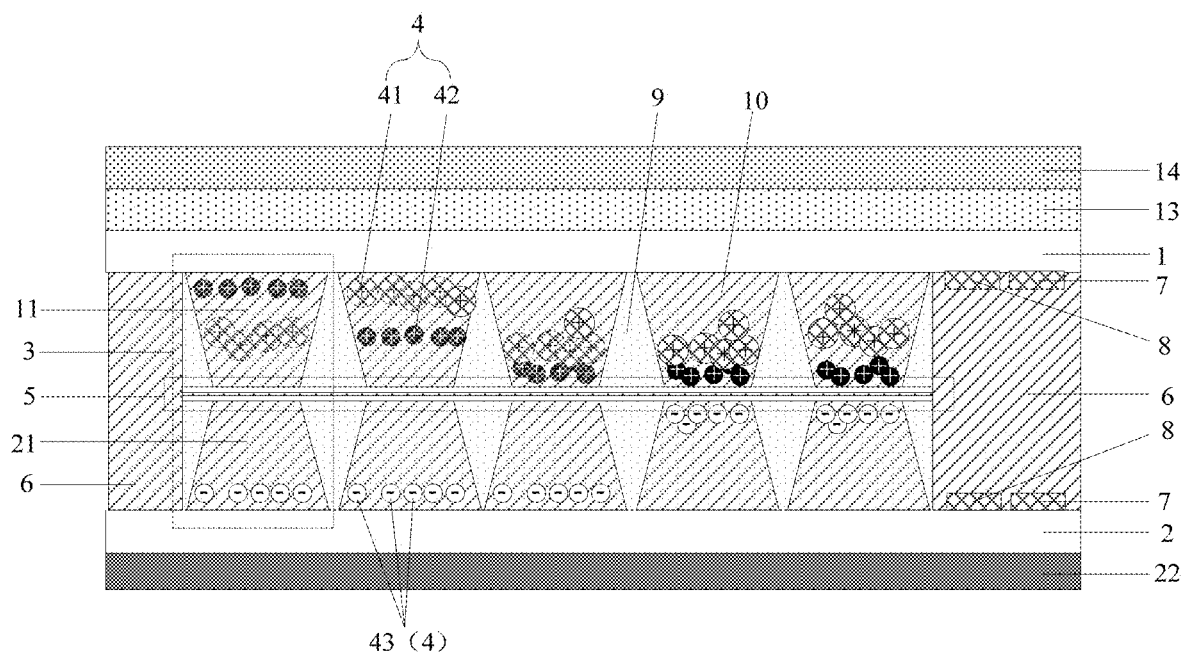
FIG. 8 is a schematic structural diagram of a specific electronic paper provided by the embodiment of the present disclosure.

Specifically, referring to FIG. 8, a transparent filling layer 9 may further be between adjacent micro-cup structures 3, and transparent electrophoretic liquid 10 may further be between the first half-cup structure 11 and the second half-cup structure 21. When three or more types of charged dye particles 4 are in the first half-cup structures 11, surfaces of the charged dye particles 4 may further be coated with a surface stabilizer, to prevent two types of charged dye particles from aggregating when the three types of charged dye particles 4 repel each other, that is, the surface stabilizer that prevent the charged dye particles from aggregating and dispersing due to interaction (preventing the charged dye particles with a single electric property from self-dispersing). The surface of the first driving backplane 1 away from the second driving backplane 2 may further be provided with an optical clear adhesive (OCA) layer 13 and a protective layer 14 located on a surface of the OCA layer 13 away from the second driving backplane 2. A control chip IC 8 and a flexible circuit board 7 can further be on both the first driving backplane 1 and the second driving backplane 2. Specifically, the first driving backplane 1 and the second driving backplane 2 may be sealed by a frame sealing adhesive 6.

Based on the same inventive concept, an embodiment of the present disclosure further provides a display device, including the electronic paper provided by the embodiments of the present disclosure.

Based on the same inventive concept, an embodiment of the present disclosure further provides a driving method of the electronic paper provided by the embodiments of the present disclosure. The driving method includes the following steps.

Step S101: loading a voltage to a first driving circuit and a second driving circuit to form a first electric field to display by charged dye particles in the first half-cup structures in a first display mode, wherein the first electric field controls the charged dye particles in first half-cup structures to move away from second half-cup structures, and controls charged dye particles in the second half-cup structures to move away from the first half-cup structures.

Step S102: loading a voltage to the first driving circuit and the second driving circuit to form a second electric field to display by the charged dye particles in the second half-cup structures in a second display mode, and the second electric field controls the charged dye particles in the first half-cup structures to move towards the second half-cup structures, and controls the charged dye particles in the second half-cup structures to move away from the first half-cup structures.

In specific implementation, each of the first half-cup structures has two types of charged dye particles, and charge-to-mass ratios of the two types of charged dye particles are different. In the first display mode, display is performed by the charged dye particles with a large charge-to-mass ratio in the first half-cup structures. The driving method of the embodiment of the present disclosure further includes the following step.

Step S103: in a third display mode, loading a voltage with a first duration to the first driving circuit and the second driving circuit to form a third electric field, loading another voltage with second duration to the first driving circuit and the second driving circuit to form a fourth electric field, wherein the third electric field and the fourth electric field are cyclically formed for multiple times until the charged dye particles with a small charge-to-mass ratio in the first half-cup structures move to a side, facing the first driving backplane, of the charged dye particles with a large charge-to-mass ratio to display by the charged dye particles with the small charge-to-mass ratio in the first half-cup structures, that is, the charged dye particles with the small charge-to-mass ratio are closer to the first driving backplane than the charged dye particles with the large charge-to-mass ratio.

An electric field direction of the third electric field is opposite to that of the first electric field, an electric field direction of the fourth electric field is opposite to that of the third electric field, an electric field intensity of the third electric field is greater than that of the fourth electric field, and the first duration is smaller than the second duration.

In specific implementation, the surface of the second driving backplane away from the first driving backplane is further provided with a reflection layer with a preset color. The driving method of the embodiment of the present disclosure further includes the following step.

In a fourth display mode, a voltage is loaded to the first driving circuit and the second driving circuit to form a fifth electric field, wherein the fifth electric field controls the charged dye particles in the first half-cup structures to aggregate at an end face facing the second half-cup structures. That is, taking the micro-cup structure 3 on the rightmost side of FIG. 1 as an example, the charged dye particles 4 in the first half-cup structures 11 aggregate at a first half-cup structure cup top 111, and controls the charged dye particles in the second half-cup structures to aggregate at an end face facing the first half-cup structures, to display by the reflection layer. That is, taking the micro-cup structure 3 on the rightmost side of FIG. 1 as an example, the charged dye particles 4 in the second half-cup structures 21 aggregate at a second half-cup structure cup top 211.

In specific implementation, the driving method of the embodiment of the present disclosure further includes the following step.

In the fourth display mode, an electric field intensity of the fifth electric field is adjusted and controlled, wherein the fifth electric field with different electric field intensities controls aggregation density of the charged dye particles in the first half-cup structures and the second half-cup structures to be different, to control reflectivity of the reflection layer to be different.

With referring to FIG. 9 to FIG. 18, taking that a surface of a first driving backplane 1 away from a second driving backplane 2 is a display surface, the first half-cup structures are upper half-cups, and the second half-cup structures are lower half-cups as examples, the driving principle in the embodiment of the present disclosure is specifically described below as follows.

If an ink-state, e.g. black, needs to be displayed, such as displayed in the upper half-cup), referring to the following.

Figure 9:
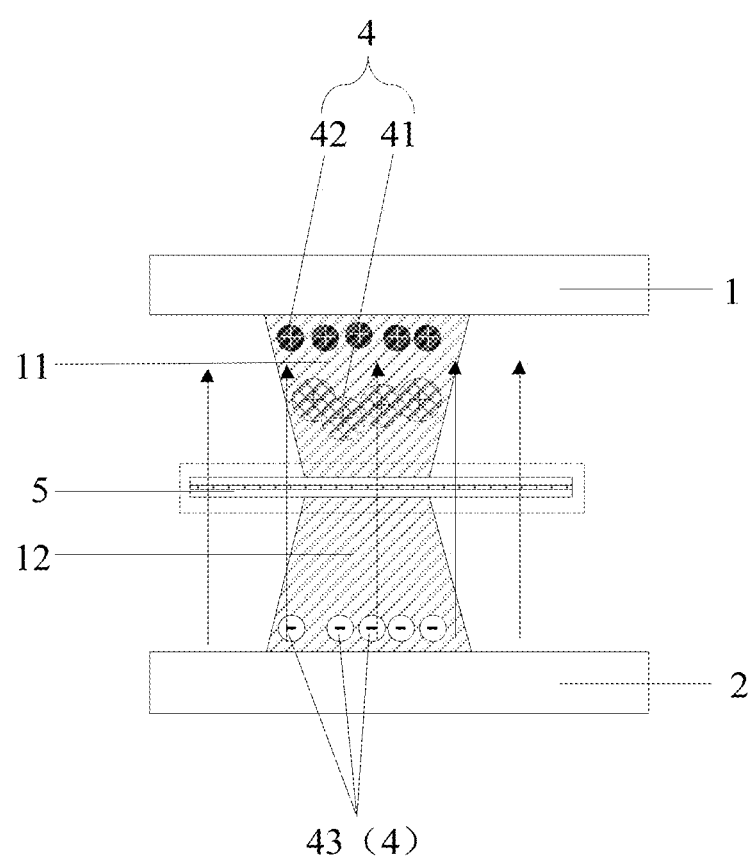
FIG. 9 is a schematic structural diagram of an electronic paper when a black image is displayed provided by the embodiment of the present disclosure.
Figure 10:
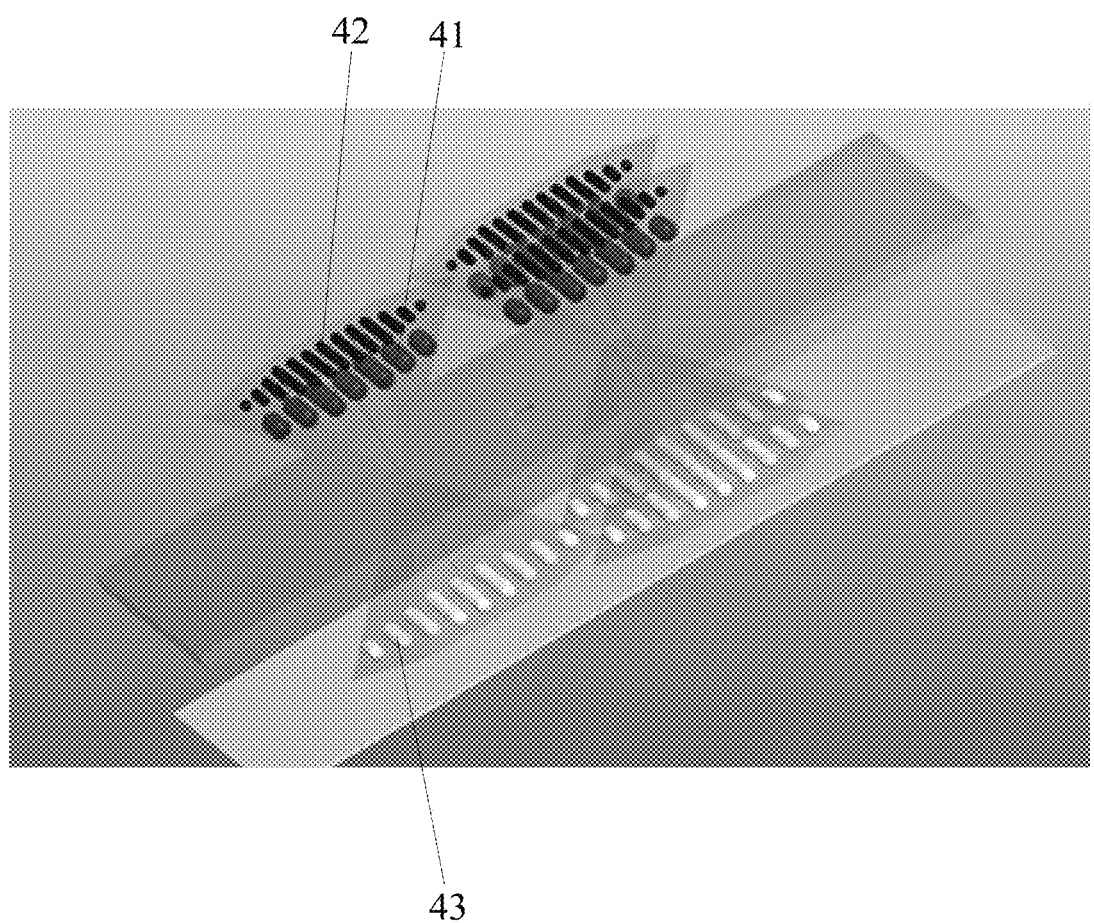
FIG. 10 is a three-dimensional schematic structural diagram of the electronic paper when a black image is displayed provided by the embodiment of the present disclosure.

As shown in FIG. 9 and FIG. 10, if black needs to be displayed, the lower second driving backplane 2 provides a positive high voltage (+15 V) for a pixel electrode layer, and the upper first driving backplane 1 provides a Vcom voltage of 0 V for its pixel electrode layer to form a first electric field. At the moment, the first electric field line is vertically upward. In the upper half-cups, black charged dye particles 42 with positive charges and red charged dye particles 41 with positive charges are subjected to the electric field force to swim towards the display surface (an upper layer cup bottom). Due to the difference in mobility between the black charged dye particles 42 and the red charged dye particles 41, the black charged dye particles 42 are more sensitive to the high voltage. Therefore, the black charged dye particles 42 migrate to the top faster, the entire display layer can appear black by applying the voltage for an appropriate time (about 80 ms), the voltage is removed after the drive is completed, and the particles can still maintain display characteristics after power off due to a steady state of the ink. At the moment, because the red charged dye particles 41 repel the black charged dye particles 42 with the same electric property as the red charged dye particles 41r, a decrease in the image maintenance characteristic caused by the effect of a built-in attraction electric field does not occur. At the moment, white charged dye particles 43 in the lower half-cups move to a back display side electrode (a lower layer cup bottom).

If an ink state e.g. red, needs to be displayed, such as displayed in upper half-cups, referring to the following.

Figure 11:
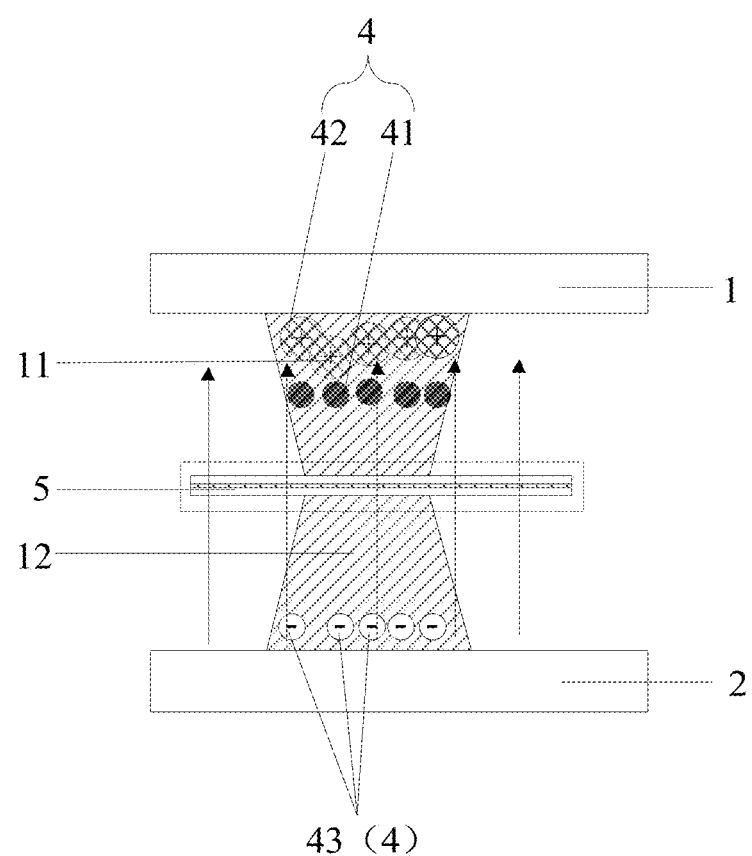
FIG. 11 is a schematic structural diagram of an electronic paper when red is displayed provided by the embodiment of the present disclosure.
Figure 12:
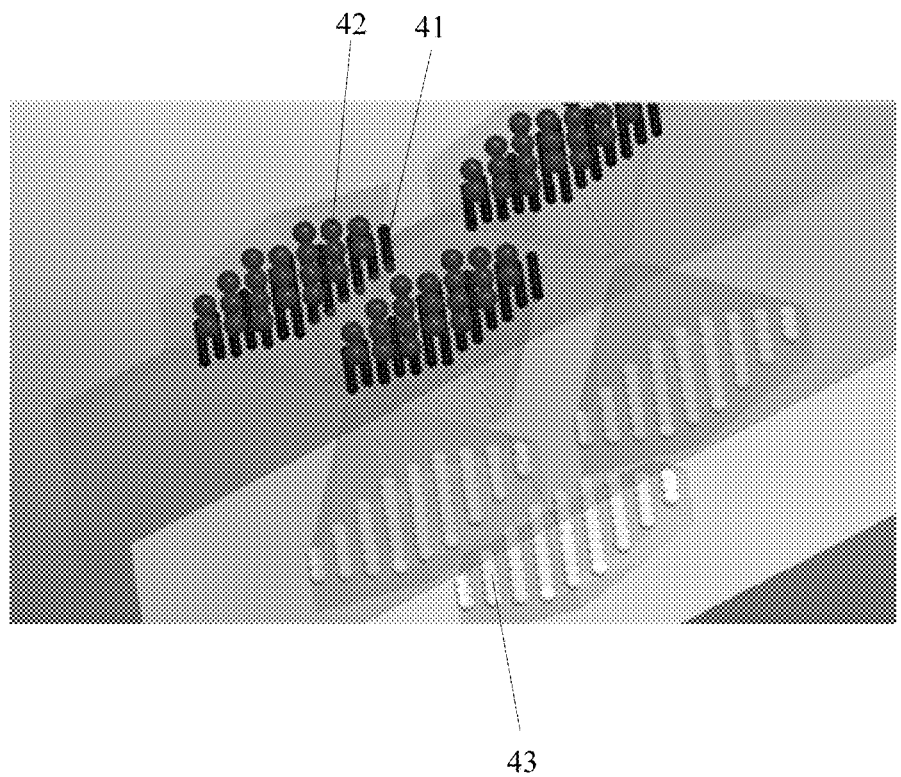
FIG. 12 is a three-dimensional schematic structural diagram of an electronic paper when red is displayed provided by the embodiment of the present disclosure.

As shown in FIG. 11 and FIG. 12, according to the difference of the mobility between the black charged dye particles 42 and the red charged dye particles 41, the lower second driving backplane 2 first provides a negative voltage (−15 V) for its pixel electrode layer for a short time (about 10 ms), the black charged dye particles 42 and the red charged dye particles 41 in the upper half-cups move to a middle electrode plate layer 5 at the same time and are layered, and the upper first driving backplane 1 provides a Vcom voltage of 0 V for its pixel electrode layer. Then, the lower second driving backplane 2 provides a low positive pressure (about +6 V) for its pixel electrode layer for a long time (about 90 ms), then the black charged dye particles 42 and the red charged dye particles 41 migrate back (to the display surface), and cycling is performed for multiple (about 4) cycles, so that display of the red charged dye particles 41 can be completed. The steady-state, non-weakening built-in electric field has good image maintenance characteristic.

If an ink state, e.g. white needs to be displayed, such as displayed in lower half-cups, referring to the following.

Figure 13:
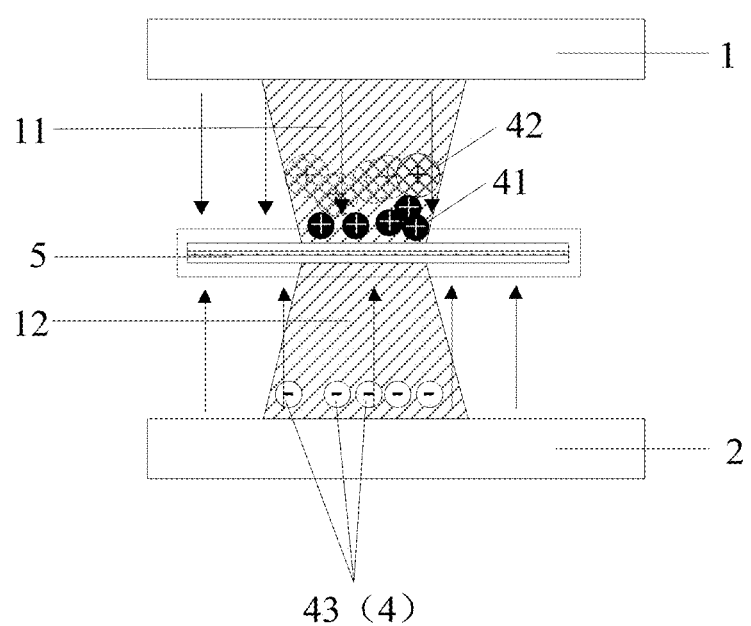
FIG. 13 is a schematic structural diagram of an electronic paper when white is displayed provided by the embodiment of the present disclosure.
Figure 14:
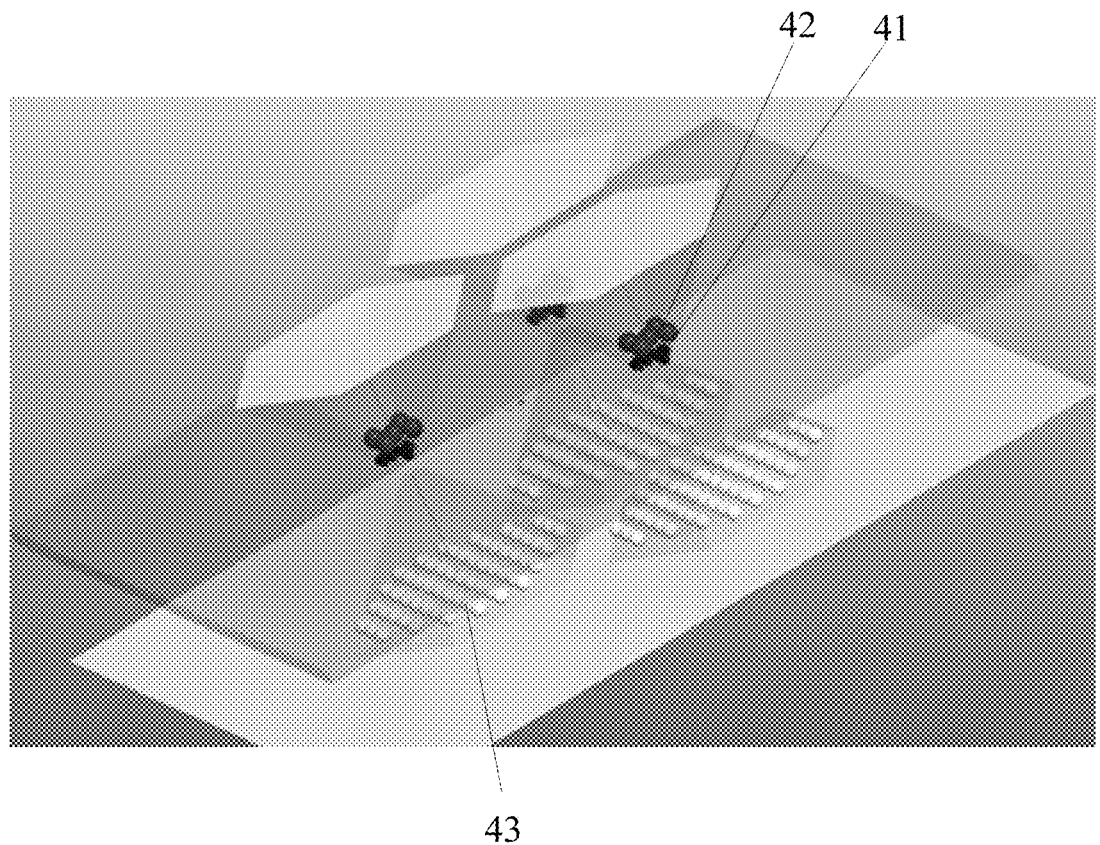
FIG. 14 is a three-dimensional schematic structural diagram of an electronic paper when white is displayed provided by the embodiment of the present disclosure.

As shown in FIG. 13 and FIG. 14, if white needs to be displayed, the lower second driving backplane 2 provides a positive high voltage (+15 V) for its pixel electrode layer, and the upper first driving backplane 1 provides a positive high voltage (+15 V) for its pixel electrode layer. Due to existence of the middle electrode plate layer 5, at the moment, the electric field line direction of the upper half-cups is downward, and the electric field line direction of the lower half-cups is upward. Therefore, in the upper half-cups, the black charged dye particles 42 with positive charges and the red charged dye particles 41 with positive charges are subjected to the electric field force to swim towards the middle electrode plate layer 5 and aggregate here. Because a size of 15 micrometers at this position cannot be seen by the human naked eyes, "invisibility" of the ink in the upper half-cups is realized. The negatively charged white particles are subject to the electric field force to move to a side away from the display surface (a lower layer cup bottom). At the moment, because the upper half-cups are already transparent, the color of white particles covering the lower layer cup bottom is displayed on the display side.

If a transparent state e.g. a color, such as bright yellow, of a reflection layer needs to be displayed, referring to the following.

Figure 15:
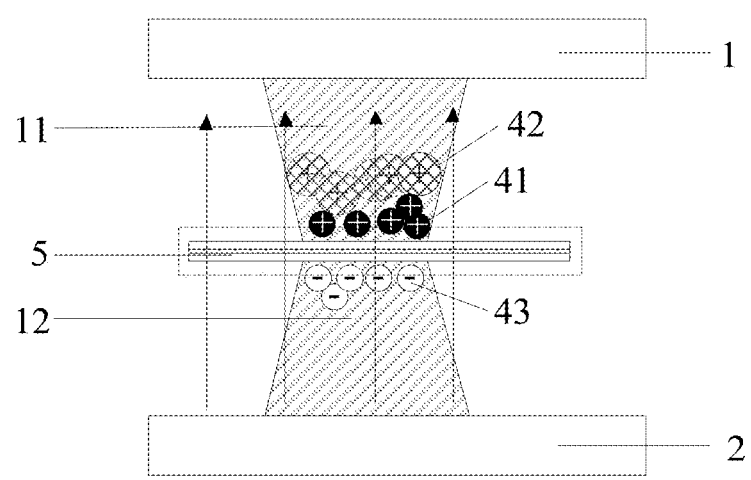
FIG. 15 is a schematic structural diagram of an electronic paper when yellow is displayed provided by the embodiment of the present disclosure.
Figure 16:
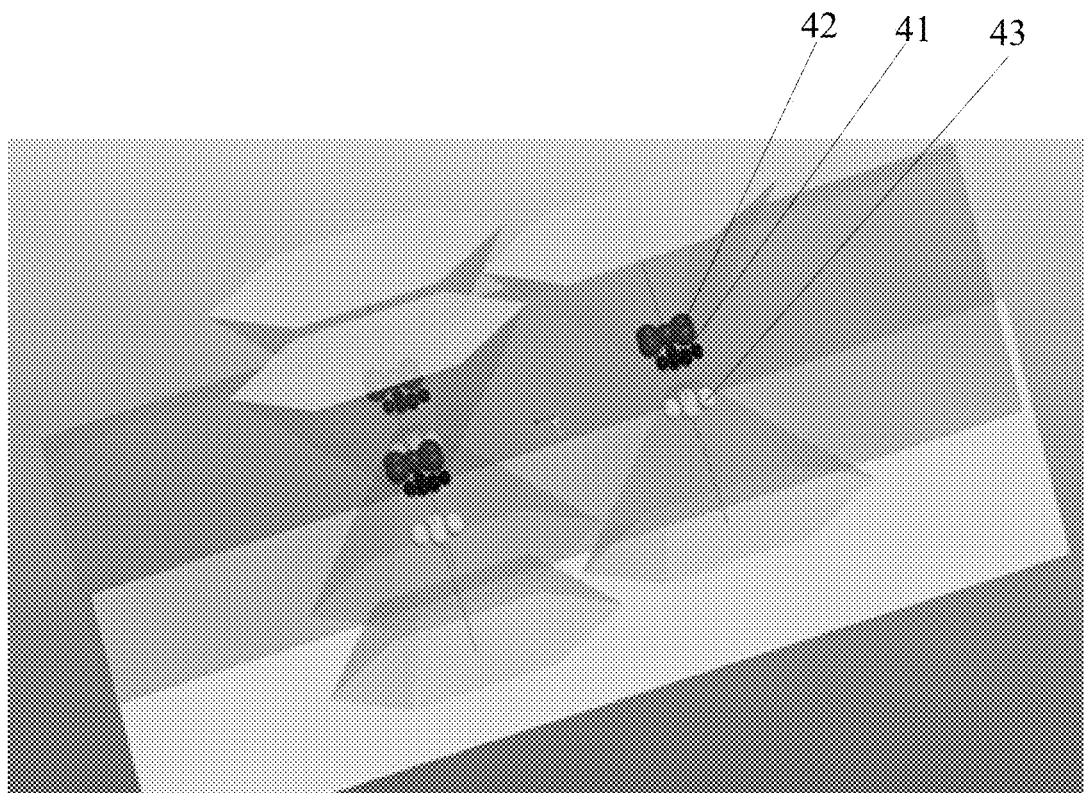
FIG. 16 is a three-dimensional schematic structural diagram of an electronic paper when yellow is displayed provided by the embodiment of the present disclosure.

As shown in FIG. 15 and FIG. 16, a color of yellow of the reflection layer needs to be displayed. The lower second driving backplane 2 provides a first-level negative high voltage (−20 V) for its pixel electrode layer for a long time (500 ms). The black charged dye particles 42, red charged dye particles 41, white charged dye particles 43 in the upper and lower half-cups all swim towards the middle electrode plate layer 5 and aggregate here. The charged dye particles in the upper and lower half-cups all aggregate at a position in which a maximum distance between two points about 15 micrometers and cannot move into the opposite cup, and no particles covers the circumference of the position in the vertical direction. Therefore, the whole cup is in a transparent state (that is, the particles in the upper and lower half-cups are all "invisible"). When the reflection layer is arranged, the brightest color of the reflection layer, that is, bright yellow, is displayed. Due to the steady state, the particles still aggregate at a position in which a maximum distance between two points about invisible to the human naked eye after power off, and the color of the reflection layer can be maintained. In this display state, because the middle electrode plate layer 5 includes non-dielectric PET carriers with a thickness of 20 micrometers at the top and bottom, though the positive and negative charged dye particles in the upper and lower half-cups are close in space distance, a capacitor is not formed and no discharge.

If a multi-transparency state, e.g. color chroma, such as dark yellow, of the reflection layer) needs to be displayed, referring to the following.

Figure 17:
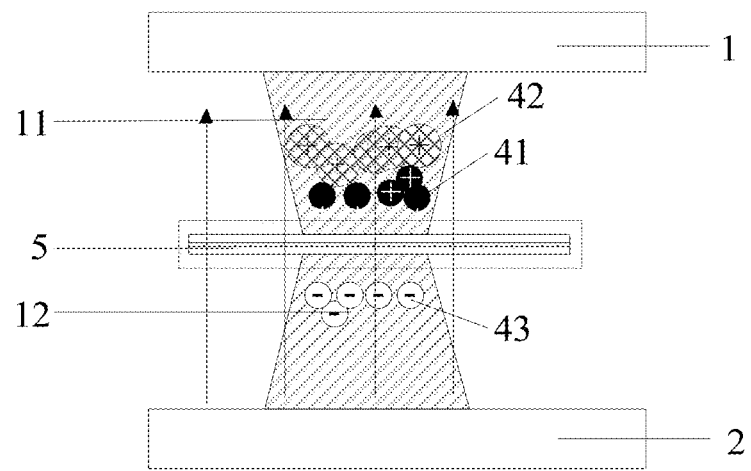
FIG. 17 is a schematic structural diagram of an electronic paper when sub-yellow is displayed provided by the embodiment of the present disclosure.
Figure 18:
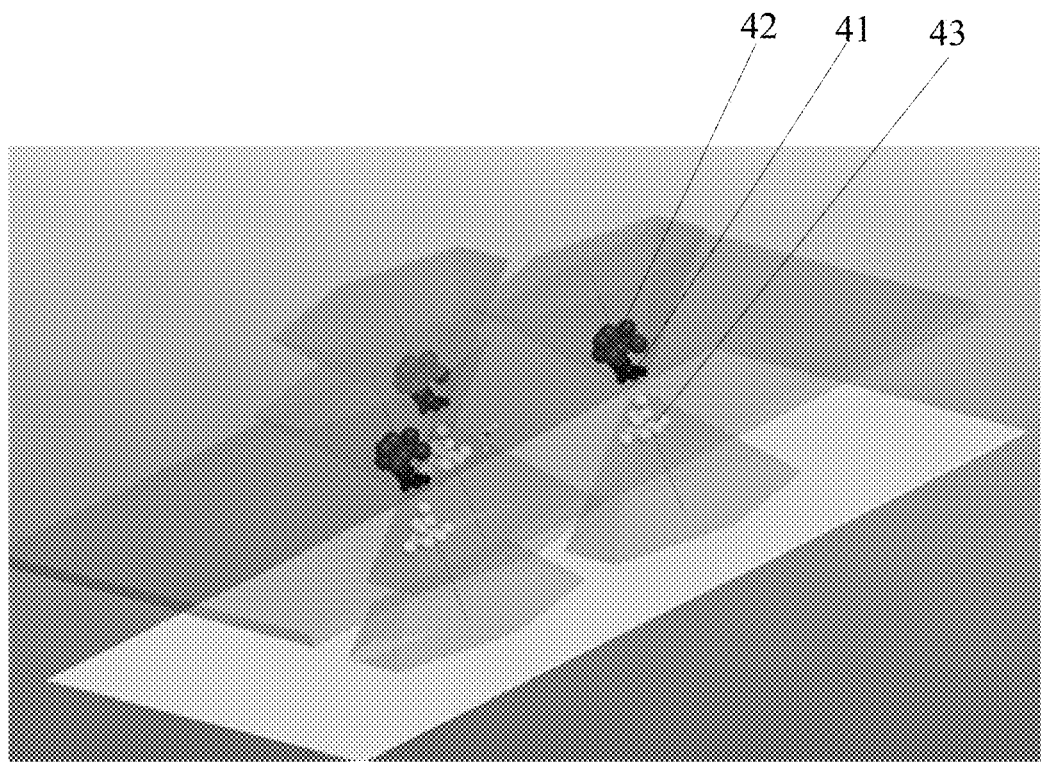
FIG. 18 is a three-dimensional schematic structural diagram of an electronic paper when sub-yellow is displayed provided by the embodiment of the present disclosure.

As shown in FIG. 17-FIG. 18, the lower second driving backplane 2 provides a second-level negative high voltage (−18 V) to its pixel electrode layer for a short time (450 ms), and the black charged dye particles 42, the red charged dye particles 41, and the white charged dye particles 43 in the upper and lower half-cups still swim around the middle electrode plate layer 5, respectively, but the aggregation density is not high as that in the previous case, and therefore light transmittance is weakened to a certain extent. Different transparency, that is, the color effect of the reflection layer with different chroma: bright yellow→sub bright yellow-→dark yellow, can be realized by controlling different negative high voltage levels (the lower the level, the smaller the negative voltage amplitude) and the driving time. According to the characteristics of the ink and the light transmittance of ITO, the present disclosure designs three different degrees of transparent color states for the reflection layer, and driving is sequentially as follows: A. bright yellow a first-level negative high voltage −20 V, 500 ms); B. sub bright yellow (a second-level negative high voltage −18 V, 450 ms); and C. dark yellow (a third-level negative high voltage −16 V, 250 ms). The design of the multi-transparency driving method of the present disclosure is only for the reflection layer with a color of yellow. When the reflection layer of other different colors is carried, the actual voltage amplitude and time for driving need to be adjusted accordingly.

The above solution of the present disclosure mainly adopts electrode driving of the second driving backplane. Actually, electrode driving of the upper first driving backplane or common driving of the dual-driving backplane may also be adopted. For example, when black/red is driven, an "upper Vcom constant voltage signal+a lower positive voltage signal" can be replaced with "an upper negative voltage signal+a lower Vcom constant voltage signal", and when the color of the reflection layer is driven, "an upper Vcom constant voltage signal+a lower negative voltage signal" can be replaced with "an upper positive voltage signal+a lower Vcom signal". Specifically, another alternative solution can be shown in Table 1, and selectivity of the driving solution is increased.

TABLE 1

| Display solution | | Display in first half-cup structures (positively charged cup) | | Display in second half-cup structures (negatively charged cup) | No display in a micro-cup structure (display of a reflection layer) |
| --- | --- | --- | --- | --- | --- |
| Driving solution/color | | Black | Red | White | Bright yellow |
| Driving of a second driving backplane | A pixel electrode layer of a first driving backplane | 0 V | 0 V | +15 V, 0.08 s | 0 V |

TABLE 1-continued

| Display solution | Driving solution/color | Display in first half-cup structures (positively charged cup) Black | Display in first half-cup structures (positively charged cup) Red | Display in second half-cup structures (negatively charged cup) White | No display in a micro-cup structure (display of a reflection layer) Bright yellow |
|---|---|---|---|---|---|
| | A pixel electrode layer of the second driving backplane | +15 V, 0.08 s | −15 V, 0.01 s; +6 V, 0.09 s; 4 cycles | +15 V, 0.08 s | −20 V, 0.5 s |
| Alternative solution 1 (driving of the first driving backplane) | The pixel electrode layer of the first driving backplane | −15 V, 0.08 s | +15 V, 0.01 s; −6 V, 0.09 s; 4 cycles | The same as the above solution | +20 V, 0.5 s |
| | The pixel electrode layer of the second driving backplane | 0 V | 0 V | | 0 V |
| Alternative solution 2 (dual backplane driving, a time is unchanged, and a voltage is decreased) | The pixel electrode layer of the first driving backplane | −7.5 V, 0.08 s | +7.5 V, 0.01 s; −3 V, 0.09 s; 4 cycles | | +10 V, 0.5 s |
| | The pixel electrode layer of the second driving backplane | +7.5 V, 0.08 s | −7.5 V, 0.01 s; +3 V, 0.09 s; 4 cycles | | -10 V, 0.5 s |
| Alternative solution 3 (dual backplane driving, the voltage is unchanged, and the time is decreased) | The pixel electrode layer of the first driving backplane | −15 V, 0.06 s | +15 V, 0.01 s; −6 V, 0.06 s; 4 cycles | | +20 V, 0.35 s |
| | The pixel electrode layer of the second driving backplane | +15 V, 0.06 s | −15 V, 0.01 s; +6 V, 0.06 s; 4 cycles | | −20 V, 0.35 s |
| Alternative solution 4 (dual backplane driving, both the time and the voltage are changed) | The pixel electrode layer of the first driving backplane | −10 V, 0.07 s | The same as the above solution | | +15 V, 0.41 s |
| | The pixel electrode layer of the second driving backplane | +10 V, 0.07 s | | | −15 V, 0.41 s |

In conclusion, in the embodiment of the present disclosure, a micro-cup structure is designed, and process separating is spatially performed on the charged dye particles of different electric properties (that is, positively charged black and red dye particles are in upper half-cups, and negatively charged white dye particles are in lower half-cups). Therefore, defects such as a complicated driving process, poor maintenance characteristic, and poor optical stability of the conventional electronic paper display products of "mixed dye particles with unlike electric properties" caused by mutual attraction of positive and negative particles in a built-in electric field can be effectively avoided. Specifically, in terms of driving, compared with the three stages necessary for the conventional electronic paper display products: reverse driving (2360 ms), activation (6560 ms), and writing (6760 ms), the electronic paper provided by the embodiments of the present disclosure only include two stages: activation (820 ms) and writing (512 ms). The total refresh time is only 1.32 s, and is as much as 14.36 s (91.58%) shorter than 15.68 s of the conventional three-color EPD. In addition, due to a steady state, the optical stability is better, there is no need to refresh every day, and the overall power consumption is also significantly reduced compared with the conventional electronic paper display products with dual electric properties. It should be noted that the significant reduction in the refresh time is due to the spatial separation of the charged dye particles with unlike electric properties, which greatly reduces the distance required for reverse driving, activation, and writing (because the internal coupling in the driving process is avoided). Because the refresh time is positively correlated to the electrophoretic distance, the refresh time is greatly shortened. In terms of process, because a central position in the micro-cup structure is narrow, and it is difficult to perform corresponding by the conventional photo spacer (PS) process, etc., a transparent insulation plate layer can be added between first half-cup structures and second half-cup structures. The implementation method is to form two PET insulation plate layers, and a manufacturing process of the PET insulation plate layers is as follows: An indium tin oxide film with a thickness of 7.5 micrometers is formed in a transparent PET substrate with a thickness of 20 micrometers, and then the two PET insulation plate layers are directly faced and attached to each other by surfaces opposite to the indium tin oxide film. In this way, an indium tin oxide film transparent electrode plate layer with a total thickness of 55 micrometers and protected by upper and lower rigid PET is formed as a whole. In terms of structure, different from the "upper paper film and lower active backplane" of the conventional electronic paper display products, in the embodiment of the present disclosure, because the reflection layer is carried, it is required that all the main structures above the reflection layer must be made of transparent materials, and the upper and lower active layers must be in a transparent state as a whole, so as to better distinguish the three states of the embodiment of the present disclosure: the upper/lower half-cup ink state and the transparent state (the color of the reflection layer). In addition, the structure of the present disclosure may not be carried with a reflection layer either, and at the moment, a transparent state can be displayed. For manufacturing of the micro-cup structure in the embodiment of the present disclosure, the transparent substrate can be subjected to a "wedge-shaped hollowed out" manner, and then the ink material is injected into a wedge-shaped micro-cup structure cavity by a one drop filling (ODF) process. Because a transparent electrode layer needs to be added into the micro-cup structure, the ODF double-layer opposite-closing method can also be used to manufacture the micro-cup structure.

The embodiments of the present disclosure can be widely used in the field of electronic shelf labels (ESL) products, to replace the conventional electronic paper display products of "mixed particles with unlike electric properties" with slow response and low light stability, and can also be extended to fields such as smart homes, the vehicle-mounted, and signs.

Beneficial effects of the embodiments of the present application are as follows: an electronic paper provided by the embodiments of the present disclosure includes two driving backplanes. The first driving backplane is provided with a plurality of first half-cup structures, and the second driving backplane is provided with a plurality of second half-cup structures. The first half-cup structures and the second half-cup structures both are only provided with charged dye particles with a single electric property, and the charged dye particles of different electric properties can be separated and placed in different cups. So a necessary distance of driving movement of the charged dye particles is reduced, a driving time of image refresh is greatly shortened, and power consumption is reduced. Poor display image purity maintenance, a longer drive time required for image refresh, and large power consumption that are caused by the charged dye particles with unlike electric properties mixed together are avoided. In addition, since the first half-cup structures and the second half-cup structures are in shapes with gradually decreasing cross-sectional areas, the charged dye particles in the first half-cup structures can move to a side proximate to the display surface and the charged dye particles in the second half-cup structures move to a side away from the display surface by applying an electric field if a surface of the first driving backplane away from the second driving backplane is used as a display surface, so that the charged dye particles in the first micro-cup structures can be driven to display. Similarly, the charged dye particles in the first half-cup structures of the first driving backplane move to a position, i.e. a position at which the first half-cup structure cup top 111 located, proximate to the second half-cup structures and the charged dye particles in the second half-cup structures move to the side away from the display surface by adjusting the electric field. Because a cross-sectional area of the first half-cup structures at this position, i.e., a position at which the first half-cup structure cup top located, is small, the charged dye particles in the first half-cup structures at this position cannot be seen by the human eye, and a transparent state can be realized. The charged dye particles in the second half-cup structures can be seen through the first half-cup structures, and the charged dye particles in the second half-cup structures can also be driven to display, so that colors displayed by the electronic paper are enriched, and a display utilization rate of the charged dye particles is increased. Compared with an electronic paper without a micro-cup structure, the embodiments of the present disclosure can implement a multi-grayscale four-color complex image by matching with the transparent driving backplanes and using the micro-cup structure driven by electrophoresis and with specific shapes, and the charged dye particles are all limited into the half-cup structures, so that bistable and lower power consumption are realized.

Apparently, a person skilled in the art can make various modifications and variations to the embodiments of the present disclosure without departing from the spirit and scope of the embodiments of the present disclosure. In this way, if these modifications and variations of the embodiments of the present disclosure fall within the scope of the claims of the present disclosure and equivalent technologies thereof, the present disclosure is also intended to include these modifications and variations.

What is claimed is:
1. An electronic paper, comprising:
 a first driving backplane;
 a plurality of first half-cup structures provided on the first driving backplane; wherein each of the first half-cup structures comprises charged dye particles with a single electric property;
 a second driving backplane;
 a plurality of second half-cup structures provided on the second driving backplane; wherein each of the second half-cup structures comprises charged dye particles with a single electric property; wherein
 a side of the second driving backplane provided with the second half-cup structures is opposite to a side of the first driving backplane provided with the first half-cup structures, the each first half-cup structure and a respective one of the second half-cup structures opposite to the each first half-cup structure constitute a micro-cup structure, and a electric property of the charged dye particles in the first half-cup structure in the micro-cup structure is opposite to a electric property of the charged dye particles in the second half-cup structure in the micro-cup structure; and
 a cross-sectional area of the respective second half-cup structures gradually decreases in a direction pointing from the second driving backplane to the first driving backplane; and a cross-sectional area of the respective first half-cup structures gradually decreases in a direction pointing from the first driving backplane to the second driving backplane.

2. The electronic paper according to claim 1, further comprising:
an electrode plate layer between the first half-cup structures and the second half-cup structures; wherein
the electrode plate layer comprises two opposite transparent insulation plate layers and a transparent electrode layer between the two transparent insulation plate layers.

3. The electronic paper according to claim 2, wherein the transparent electrode layer is of a whole layer structure.

4. The electronic paper according to claim 1, wherein:
each of the first half-cup structures and each of the second half-cup structures are prism-shaped, or each of the first half-cup structures and each of the second half-cup structures are conical-frustum-shaped; and
an orthographic projection, on the first driving backplane, of the first half-cup structures overlaps an orthographic projection, on the first driving backplane, of the second half-cup structures.

5. The electronic paper according to claim 4, wherein:
shapes of cross sections that are parallel to the first driving backplane of the first half-cup structure and the second half-cup structure opposite to it are both regular hexagons or circles;
wherein a distance between any two points in a minimum cross section is not more than 15 micrometers, a distance between two opposite edges of a maximum regular hexagonal cross section is 130 micrometers to 150 micrometers, and a diameter in a maximum circular cross section is 130 micrometers to 150 micrometers.

6. The electronic paper according to claim 4, wherein a height of each of the first half-cup structures and a height of each of the second half-cup structures both are 60 micrometers to 70 micrometers.

7. The electronic paper according to claim 6, wherein the height of each of the first half-cup structures is same as the height of each of the second half-cup structures.

8. The electronic paper according to claim 2, wherein the charged dye particles in the plurality of first half-cup structures have the same electric properties, and the charged dye particles in the plurality of second half-cup structures have the same electric properties.

9. The electronic paper according to claim 8, wherein a surface, away from the second driving backplane, of the first driving backplane is a display surface; and
the charged dye particles with the single electric property in each of the first half-cup structures are charged dye particles of two colors with different charge-to-mass ratios.

10. The electronic paper according to claim 9, wherein each of the second half-cup structures comprises the charged dye particles of one color, and the color of the charged dye particles in the second half-cup structures is different from the color of the charged dye particles in the first half-cup structures.

11. The electronic paper according to claim 10, wherein a surface, away from the first driving backplane, of the second driving backplane is further provided with a reflection layer, and a color of the reflection layer is different from both the color of the charged dye particles in first half-cup structures and the color of the charged dye particles in the second half-cup structures.

12. The electronic paper according to claim 11, wherein the charged dye particles of two colors in each of the first half-cup structures are respectively red charged dye particles with positive charges and black charged dye particles with positive charges, wherein a charge-to-mass ratio of the black charged dye particles is greater than a charge-to-mass ratio of the red charged dye particles;
the charged dye particles in each of the second half-cup structures are white charged dye particles with negative charges; and
the color of the reflection layer is yellow.

13. The electronic paper according to claim 1, wherein:
the first driving backplane and the second driving backplane each comprise a transparent substrate, and a plurality of pixel circuits on the transparent substrate; wherein
one of the pixel circuit correspondingly drives one microcup structure, the pixel circuits of the first driving backplane are between the transparent substrate of the first driving backplane and the first half-cup structures of the first driving backplane, and the pixel circuits of the second driving backplane are between the transparent substrate of the second driving backplane and the second half-cup structures of the second driving backplane.

14. The electronic paper according to claim 13, wherein each of the pixel circuits comprises: a first electrode layer, a gate insulation layer, an active layer, a source-drain layer, a passivation layer, and a pixel electrode layer located on the transparent substrate in sequence; wherein
the first electrode layer comprises gates separated from each other and a common electrode, the source-drain layer comprises sources and drains, and the pixel electrode layer is electrically connected with the respective one drain by through respective holes penetrating through the passivation layer; and
an orthographic projection, on the transparent substrate, of the pixel electrode layer overlaps an orthographic projection, on the transparent substrate, of the microcup structure, and the orthographic projection, on the transparent substrate, of the pixel electrode layer overlaps an orthographic projection, on the transparent substrate, of the common electrode;
the pixel electrode layer of the first driving backplane and the pixel electrode layer of the second driving backplane are configured to load a voltage that controls movement of the charged dye particles when displaying;
the pixel electrode layer of the first driving backplane and the common electrode of the first driving backplane are configured to form a first storage capacitor to maintain stability of a voltage of the pixel electrode layer of the first driving backplane when displaying; and
the pixel electrode layer of the second driving backplane and the common electrode of the second driving backplane are configured to form a second storage capacitor to maintain stability of a voltage of the pixel electrode layer of the second driving backplane when displaying.

15. The electronic paper according to claim 14, wherein materials of the pixel electrode layer and the common electrode are transparent conductive materials.

16. A display device, comprising the electronic paper according to claim 1.

17. A driving method of the electronic paper according to claim 1, comprising:

in a first display mode, loading a voltage to a first driving circuit and a second driving circuit to form a first electric field to display by the charged dye particles in the first half-cup structures; wherein the first electric field controls the charged dye particles in first half-cup structures to move away from second half-cup structures, and controls the charged dye particles in the second half-cup structures to move away from the first half-cup structures; and in a second display mode, loading a voltage to the first driving circuit and the second driving circuit to form a second electric field to display by the charged dye particles in the second half-cup structures, wherein the second electric field controls the charged dye particles in the first half-cup structures to move towards the second half-cup structures, and controls the charged dye particles in the second half-cup structures to move away from the first half-cup structures.

18. The driving method according to claim 17, wherein the charged dye particles having a single electric property in each of the first half-cup structures are charged dye particles of two colors with different charge-to-mass ratios, and in the first display mode, display is performed by the charged dye particles with a large charge-to-mass ratio in the first half-cup structures; and the driving method further comprises:
in a third display mode, loading a voltage with a first duration to the first driving circuit and the second driving circuit to form a third electric field, loading another voltage with second duration to the first driving circuit and the second driving circuit to form a fourth electric field, and cyclically forming the third electric field and the fourth electric field for multiple times until the charged dye particles having a small charge-to-mass ratio in the first half-cup structures move to a side, facing the first driving backplane, of the charged dye particles with the large charge-to-mass ratio to display by the charged dye particles with the small charge-to-mass ratio in the first half-cup structures; wherein an electric field direction of the third electric field is opposite to that of the first electric field, an electric field direction of the fourth electric field is opposite to that of the third electric field, an electric field intensity of the third electric field is greater than that of the fourth electric field, and the first duration is less than the second duration.

19. The driving method according to claim 18, wherein the surface, away from the first driving backplane, of a second driving backplane is further provided with the reflection layer of a preset color; and the driving method further comprises:
in a fourth display mode, loading a voltage to the first driving circuit and the second driving circuit to form a fifth electric field to display by the reflection layer, wherein the fifth electric field controls the charged dye particles in the first half-cup structures to aggregate at an end face facing the second half-cup structures, and controls the charged dye particles in the second half-cup structures to aggregate at an end face facing the first half-cup structures.

20. The driving method according to claim 19, wherein the driving method further comprises:
in the fourth display mode, adjusting an electric field intensity of the fifth electric field to control reflectivity of the reflection layer to be different, wherein the fifth electric field with different electric field intensities controls aggregation density of the charged dye particles in the first half-cup structures and the second half-cup structures to be different.

* * * * *